(12) United States Patent
Janiczek

(10) Patent No.: US 12,293,442 B1
(45) Date of Patent: May 6, 2025

(54) METHODS AND SYSTEMS FOR GENERATING PROJECTIONS OF REPRESENTATIONS OF DATA IN A PLURALITY OF SPACES

(71) Applicant: Flourish Worldwide, LLC, Denver, CO (US)

(72) Inventor: Joseph J. Janiczek, Englewood, CO (US)

(73) Assignee: Flourish Worldwide, LLC, Denver, CO (US)

( * ) Notice: Subject to any disclaimer, the term of this patent is extended or adjusted under 35 U.S.C. 154(b) by 0 days.

(21) Appl. No.: 18/778,031

(22) Filed: Jul. 19, 2024

(51) Int. Cl.
  *G06T 11/20* (2006.01)
  *G06Q 10/1093* (2023.01)
  *G08B 21/24* (2006.01)

(52) U.S. Cl.
  CPC ........ *G06T 11/206* (2013.01); *G06Q 10/1097* (2013.01); *G08B 21/24* (2013.01)

(58) Field of Classification Search
  CPC .......................... G06T 11/206; G06Q 10/1097
  See application file for complete search history.

(56) References Cited

U.S. PATENT DOCUMENTS

| | | | |
|---|---|---|---|
| 6,988,096 B2 | 1/2006 | Gupta | |
| 2012/0329019 A1* | 12/2012 | Dalton-Webb | G09B 19/0038 434/245 |
| 2016/0005320 A1 | 1/2016 | Decharms | |
| 2017/0213006 A1 | 7/2017 | Beale | |
| 2017/0344535 A1* | 11/2017 | Shima | G06F 40/284 |
| 2018/0068247 A1* | 3/2018 | Okuda | G06Q 10/06316 |
| 2020/0104782 A1* | 4/2020 | Katz | G06Q 10/063116 |
| 2020/0302296 A1 | 9/2020 | Miller | |
| 2021/0178226 A1 | 6/2021 | Abecassis | |

OTHER PUBLICATIONS

"Track your work with progress bars", https://blog.airtable.com/track-your-work-with-progress-bars/, Jun. 29, 2023. (Year: 2023).*

* cited by examiner

*Primary Examiner* — Michelle L Sams
(74) *Attorney, Agent, or Firm* — Caldwell Intellectual Property Law

(57) ABSTRACT

Aspects of the present disclosure generally relate to apparatus and method of generating projections of representations of data in a plurality of spaces.

16 Claims, 14 Drawing Sheets

| Vocational 204 | Marriage 208 | Family 212 |
|---|---|---|
| Health 216 | Virtue 220 | Emotional 224 |
| Financial 228 | Spiritual 232 | Intellectual 236 |
| Lifestyle 240 | Interest 244 | Social 248 |

METHODS AND SYSTEMS FOR GENERATING PROJECTIONS OF REPRESENTATIONS OF DATA IN A PLURALITY OF SPACES

FIELD OF THE INVENTION

The present invention generally relates to the field of artificial intelligence (AI) and simulation/modeling. In particular, the present invention is directed to methods and systems for generating projections of representations of data in a plurality of spaces.

BACKGROUND

Many domains are present within which users would like to exploit maximum value. However, user schedules are a finite resource. A user often must handle priorities and/or conflicts with multiple life realms outside these closed or limited systems. As such, it may be desirable to generate an optimal schedule that enables a user to participate in activities that may boost a user's performance within multiple realms of life.

SUMMARY OF THE DISCLOSURE

In an aspect, a method of generating projections of representations of data in a plurality of spaces, the method including receiving, by a computing device, user data of a user, generating, by the computing device, a representation in a first space as a function of the first data, wherein the first space comprises a first quantity of dimensions, projecting the representation to a second space, wherein the second space comprises a second quantity of dimensions, presenting, by the computing device at a remote device, a notification to the user related to the first quantity of dimensions and the second quantity of dimensions.

In another aspect an apparatus An apparatus for generating an optimal schedule for interactive curriculum, the apparatus configured to receive user data of a user, generate a representation in a first space as a function of the first data, wherein the first space comprises a first quantity of dimensions, project the representation to a second space, wherein the second space comprises a second quantity of dimensions, present at a remote device a notification to the user related to the first quantity of dimensions and the second quantity of dimensions.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a table illustrating exemplary domains;

FIG. 13B is an exemplary remote device including an exemplary graphical user interface.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating projections of representations of data in a plurality of spaces. In one or more embodiments, a user may select certain domains that are preferential for exploitation. The present disclosure represents a practical application of exploiting value in certain domains, in part, by allowing users to automatically have targets for domains and schedules generated. Furthermore, a user may track progress in the schedule and be notified of such progress at predetermined intervals. Additionally, the disclosure teaches an improvement of present computing systems as these automated tasks may be performed on a device other than the user's local device allowing access to larger computing powers and higher levels of automation.

Aspects of the present disclosure can be used to set targets to achieve with respect to certain domains. Aspects of the present disclosure can also be used to schedule plans in order to progress toward achievement of targets. This is so, at least in part, because, in some embodiments, schedules may be generated as a function of domain targets to allow for goal clarity.

Aspects of the present disclosure allow for improving status within one or more domains. Exemplary embodiments illustrating aspects of the present disclosure are described below in the context of several specific examples.

Figure 1:
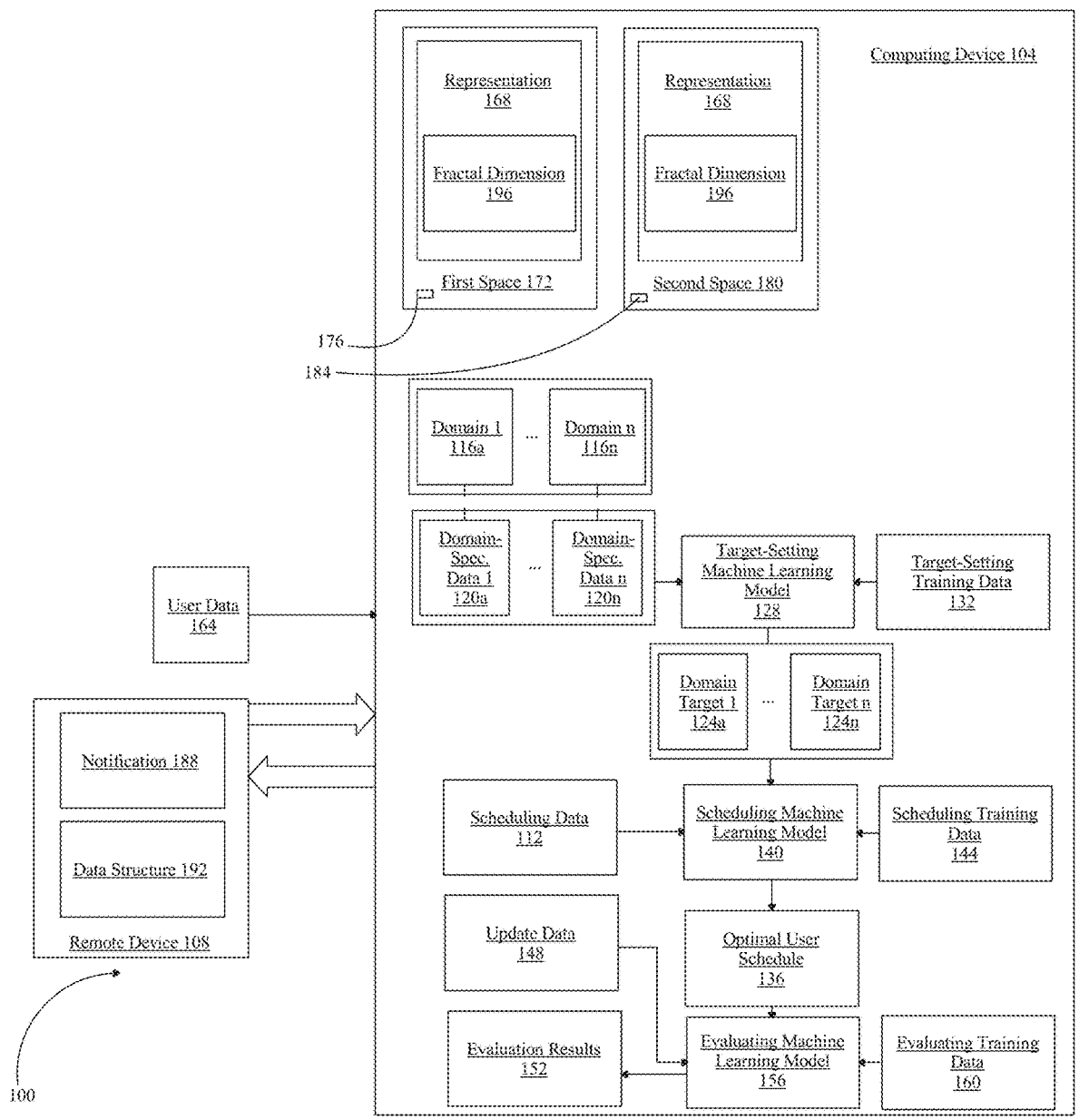
FIG. 1 is a block diagram illustrating an exemplary system for exploiting value in certain domains.

Referring now to FIG. 1, an exemplary embodiment of an apparatus 100 for exploiting value in certain domains is illustrated. Apparatus 100 includes a computing device 104. Computing device 104 may include any computing device as described in this disclosure, including without limitation a microcontroller, microprocessor, processor, digital signal processor (DSP) and/or system on a chip (SoC) as described in this disclosure. In one or more embodiments, computing device may include a processor, which may be communicatively connected to a memory, where the memory includes instructions configuring the processor to execute any of the methods, steps, processes, and the like described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device may include, be a component of, or be communicatively connected to computing device 1100 of FIG. 11. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may include a remote device 108. As used in this disclosure, a "remote device" is a computing device that is remote to another computing device. In some cases, a remote device 108 may be in communication with computing device 104 for example by way of one or more networks. One or more networks may include any network described in this disclosure, for instance networks described in reference to FIG. 9. In some cases, remote device 108 may include a personal computing device, such as without limitation a smart phone, a tablet, a desktop, a laptop, or the like. In one or more embodiments, remote device 108 may include a laptop, smartphone, tablet, desktop, or any other electronic device.

With continued reference to FIG. 1, computing device 104 and/or processor may be configured to receive user data 164 from a user. "User data," as used in this disclosure, is data that is associated with a user. In one or more embodiments, user data 164 may include a baseline level that represents the current status of the user in an area of interest and/or a status that the user desires to achieve in the area of interest.

With continued reference to FIG. 1, in some cases, user data 164 may include scheduling data 112. As used in this disclosure, "scheduling data" is information associated with a schedule. For instance, and without limitation, scheduling data may include days and times which a user is busy or free. Scheduling data may include itemized events or blocks of time allocated to one or more activities. In some cases, scheduling data may include calendar data, such as without limitation, an Outlook calendar file, a Google calendar file, an Apple calendar file, and the like. In some cases, scheduling data may include an invite, such as, for example, an Outlook invite. In some cases, scheduling data may include temporal data (i.e. when), spatial data (i.e. where), personnel data (i.e. with whom), and the like. In one or more embodiments, temporal data may include a predetermined interval or duration of time within which the user wishes to develop or improve in the area of interest. For example, and without limitation, a predetermined interval may include 30 days, 60 days, 90 days, and the like.

With continued reference to FIG. 1, in one or more embodiments, user data 164 may include a domain 116*a-n*. As used in this disclosure, a "domain" is an area of a user's life. Domain may include areas of life such that a user may set goals across various areas of the user's life. Exemplary non-limiting domains include a vocational domain, a marriage domain, a family domain, a health domain, a virtue domain, an emotional domain, a financial domain, a spiritual domain, an intellectual domain, a lifestyle domain, an interest domain, and a social domain. For example, and without limitation, a domain may include an area of interest of the user that the user wishes to develop in or improve upon, such as, for example, spirituality, faith, religious practice or study, matrimonial harmony, personal finance, professional advancement, intellectual stimulation, personal interests, socializing, and the like. Domain may include any domain described in this disclosure, including those described with reference to FIG. 2.

With continued reference to FIG. 1, computing device 104 may receive user data, such as scheduling data 112 or domain 116*a-n*, from user by way of remote device 108.

Alternatively or additionally, computing device 104 may receive user data from a third party on a remote device 108 and/or a local device. In some cases, at least a domain 116a-n may include at least one domain 116a and no more than a predetermined maximum number of domains. As used in this disclosure, a "predetermined maximum number of domains" is a high threshold which a user may select for exploitation. In some cases, predetermined maximum number of domains may be within a range of 1 and 15, for instance 10, 5, 4, 3, 2, or 1.

Still referring to FIG. 1, in one or more embodiments, computing device 104 and/or processor may be configured to interrogate a user for user data. "Interrogating," as used in this disclosure, is an act of prompting for a response. In some cases, interrogating may include displaying multiple prompts, such as without limitation fields, drop-down boxes, check boxes, radio switches, and the like. In some cases, interrogating may be performed according to a set of prompts, for instance as with a questionnaire. In one or more embodiments, apparatus 100 may interrogate user for additional user data, including for example domain-specific data 120a-n as a function of at least a domain 116a-n. In some cases, each element of domain-specific data 120a-n may be associated with a domain of at least a domain 116a-n. As used in this disclosure, "domain-specific data" is information that is associated with a domain. Exemplary domain-specific data is described below with reference to twelve separate domains in FIG. 2. Domain-specific data may be evidential and associated with a user's current status within a domain. Alternatively or additionally, domain-specific data may be aspiration and associated with a user's desired status within a domain. In other embodiments, interrogating may be used to retrieve additional information related to domain target, scheduling data, and/or any other information discussed in this disclosure.

With continued reference to FIG. 1, apparatus 100 may generate a domain target 124a-n for domain 116a-n, for example, by using computing device 104. In one or more embodiments, domain target 124a-n may be generated as a function of domain 116a-n and/or scheduling data 112, such as temporal data. As used in this disclosure, a "domain target" is a goal associated with a domain. In some cases, apparatus 100 may generate domain target 124a-n as a function of domain-specific data 120a-n. In some cases, each domain target of domain target 124a-n may be associated with a domain of domain 116a-n. In some embodiments, domain target 124a-n may include a quarterly target. As used in this disclosure, a "quarterly target" is a goal that may be strived for within a quarter of a year. In some cases, a quarterly target may represent a longer-term goal or progression than can normally be achieved within a shorter schedule, such as week or a month. In some embodiments, at least a domain target 124a-n includes a yearly target. As used in this disclosure, a "yearly target" is a goal that may be strived for within a year. In some cases, a yearly target may represent a longer-term goal or progression than can normally be achieved within a shorter schedule, such as week or a month. In some embodiments, at least a domain target 124a-n includes a five-year target. As used in this disclosure, a "five-year target" is a goal that may be strived for within a five-year period. In some cases, a five-year target may represent a longer-term goal or progression than can normally be achieved within a shorter schedule, such as week or a month. In some cases, apparatus 100 may generate at least a domain target 124a-n by using a machine learning process, for example a target-setting machine learning model 128. Target-setting machine learning model 128 may include any machine learning process described in this disclosure, including those described with reference to FIGS. 4-7. In some cases, target-setting machine learning model 128 may include a classifier, such as any classifier described in this disclosure, for example with reference to FIG. 7.

Still referring to FIG. 1, in one or more embodiments, user data may include precision data. For the purposes of this disclosure, "precision data" may include information associated with perceived clarity of a goal by a user. In one or more embodiments, precision data may include goal decisiveness, a focus level, action definitiveness, and learning aptitude. For the purposes of this disclosure, "goal decisiveness" is information related to a long-term, or "broad", domain target, where broad domain target is a goal over a duration of the user's life. For instance, and without limitation, long-term domain target may include a lifetime goal, such as, for example, a revenue goal, a spiritual achievement goal, an exercise goal, and the like. In one or more embodiments, broad target domain may include a plurality of lifetime goals, which may be ordered according to a desired time of achievement within the user's life. For the purposes of this disclosure, a "focus level" is information related to short-term domain targets. For instance, and without limitation, a user may select a plurality of short-term domain targets to improve in a specific amount of time, such as, for example, 10 days, 30 days, 60 days, or 90 days. A short-term domain target may include, for example and without limitation, a human resource goal, a dietary goal, a fitness goal, relationship goal (e.g., romantic, friendship, familial, and so on), a spiritual goal, and the like. Having short-term domain targets may allow a user to increase focus on a particular goal by executing the goal over a shortened duration of time. In one or more embodiments, a machine-learning model may be used to receive user data specifying a short-term goal. For instance, a user may provide a word, image, film, sound, or the like to assist the user in staying on track with the short-term goal and increase current focus levels. In one or more embodiment, goal decisiveness and/or focus level may include a transformative rating. A "transformative rating" is, for the purposes of this disclosure, a quantitative or qualitative value related to an emotional and/or mental state of a user related to a domain and/or domain target. For instance, and without limitation, transformative rating may include a user's receptiveness to change, such as change in a particular domain to achieve domain target. Transformative rating may include, for example and without limitation, a level of frustration of a user, such as a numerical rating (e.g., a value on a scale, such as a 1-10 or 1-100) associated with how "fed up" a user is with an aspect, or domain, of life. In other embodiments, transformative rating may include a level of receptiveness, where a level of receptiveness includes a user's willingness to change in one or more aspects in relation to a domain. Transformative rating may be inputted by a user. For example, a user may fill out a questionnaire, answer one or more prompts (e.g., chatbot prompts), and the like.

Still referring to FIG. 1, in one or more embodiments, transformative rating may include a level of capability, where a level of capability includes the resources at the user's disposal to achieve a domain target, such as monetary limitations, time limitations, and the like.

Still referring to FIG. 1, apparatus may be configured to provide a feedback element. For instance, and without limitation, if domain target of the user is a human resource goal, apparatus may be configured to provide recommendations to user to improve employee benefits of the user.

Furthermore, apparatus may provide recommendations of feedback elements in segments, such as a plurality of insights related to a single domain target. Feedback elements may include one or more aspects of a domain target that have not been achieved by user and recommendations on how to make progress regarding completing or achieving the domain target. In one or more embodiments, feedback element may include information in the form of audio, visual, and the like. For instance, and without limitation, feedback element may include a generated message that include text, images (e.g., picture or video), or sound. In some embodiments, generated message may include a song, movie, quote, or other inspirational or motivational aspect. In one or more embodiments, feedback element may include changes in domain target to provide an updated domain target based on progression and inputs from the user.

Still referring to FIG. 1, generating a domain target may include establishing a target clarity. As used in the current disclosure, a "target clarity" is one or more suggestions to help the user achieve a given domain target. A target clarity may include a set of steps or sub targets a user must achieve to progress towards a given domain target. As used in the current disclosure, a "sub-target" is milestone or sub-goal that must be achieved in order to accomplish a domain target. In a non-limiting example, computing device 104 may establish a domain target regarding a user's health. A target clarity regarding the given domain target may include establishing a fitness plan with several milestones or sub-targets. In another non-limiting example, computing device 104 may establish a domain target related to the user's finances. A target clarity may provide a user with a step-by-step financial plan for the user. In an embodiment, target clarity may include panoramic target clarity, orderly target clarity, united target clarity, breakthrough target clarity, creative target clarity, compelling target clarity, and the like. In an embodiment, united target clarity may include information identifying a single purpose one can live across multiple target domains, such as financial domain, health & fitness domains, career domains, relationship domains, familial domain, and the like.

With continued reference to FIG. 1, target clarity may include panoramic target clarity. As used in the current disclosure, "panoramic target clarity" is one or more suggestion used to provide clarity to the user in on or more domains of their life. This may include providing suggestions to provide clarity in domains such as a financial domain, health & fitness domains, career domains, relationship domains, familial domain, and the like. Panoramic target clarity may be used to allow the user to pan out and have a clear overview of the goal/target accomplishing process. A panoramic target clarity may be displayed graphically using a Gantt chart, timeline, or other graphs. Additionally, panoramic target clarity may be displayed using a color coded chart (i.e. Flywheel) or grid (i.e. 3×4 grid).

With continued reference to FIG. 1, target clarity may include orderly target clarity. As used in the current disclosure, "orderly target clarity" is a ordering or ranking of the suggestions that was provided by the panoramic target clarity. In an embodiment, Orderly target clarity may include adding order to it in terms of long-term priority to the suggestions provided by panoramic target clarity. This may be done with the goal of allowing the user to be their best and function in a flow state. In an embodiment, computing device 104 suggestions provided by the panoramic target clarity according to the domain preference of the client. In a non-limiting example, domains related personal responsibility and integrity may be prioritized first, then domains related to relationships, and the like. Orderly target clarity may include a ranking of the milestones/sub-targets. In an embodiment, the milestones or sub-targets may be ranked according to achievability, user priority, priority to achieving the domain target, lead-time, difficulty, and the like. Orderly target clarity may include an identification of the most vital steps/sub-targets. In an embodiment, computing device 104 may be configured to identify that a particular sub-target may be the most difficult portion of the domain target achieving process. Alternatively, orderly target clarity may include an identification the most vital sub-target to the user's domain target achieving process. Processor may rank each of the milestones/sub-targets using a target-setting machine learning model or any other machine learning model disclosed herein. In an embodiment, orderly target clarity may include a timeline to accomplish each milestone or sub-goal related to the domain target. Orderly target clarity may include a visual overview of the timeline for achieving a domain target.

Still referring to FIG. 1, setting a domain target 124 (e.g., domain target 124a-n) may additionally include identifying a focus clarity. As used in the current disclosure, a "focus clarity" is one more suggestions used to help the user focus on achieving a domain target 124. In an embodiment, focus clarity may include information related to selecting a target domain to focus regardless of the overall priority, as denoted by the orderly target clarity. For example, focus clarity may include selecting and prioritizing the domain target for a pre-determined time period. Focus clarity may additionally include a suggestion to user to takes steps to improve their emotional state. Suggestions may include therapy, spending time with family/friends, and the like. Focus clarity may involve establishing a clear focus and strategies to enhance focus and emotional well-being to effectively achieve a specified domain target. Focus clarity may include a holistic view of goal-setting, considering both the targeted achievement and the emotional and mental state of the individual working toward that goal. In an embodiment, focus clarity may include category focus clarity, critical focus clarity, transformative focus clarity, big breakthrough focus clarity, opportunity focus clarity, rock focus clarity, and the like.

Still referring to FIG. 1, setting a domain target 124 may additionally include identifying action clarity. For the purposes of this disclosure, "action clarity" is an identification of an action that will most likely lead progress towards a domain target, sub-target, or milestone. In some embodiments, action clarity may include actions for a particular focus category that are likely to allow a 90-day goal to be achieved. In an embodiment, action clarity may include an action the user desires to consistently implement when attempting to achieve domain target. For example, and without limitation, action clarity may include a habit or action that the user desires to achieve. For instance, and without limitation, user may wish to create a habit that is consistently completed over any duration of time. Action clarity may include an item that the user wants to eliminate. Action clarity may include an item that a user wants to automate. Action Clarity may involve getting in and staying in optimal flow state while progressing towards a domain target 124 and its associated milestones. Action clarity may include an identification of an action that assists users in optimizing flow state by assisting the user to put in place the right combination of ingredients known to induce and maintain the optimal flow state. In a non-limiting example, if a user has a domain target 124 that is appropriately challenging it may require an appropriate level of skill to match the challenge that can be measured and assessed by various machine learning models as described herein. In some cases, training data for the machine learning models may include a skill measurement of the user and user feedback. Action clarity may include eliminate, automate, delegate, elevate, pivot, create, transform or transcend (EADEPCTT) action clarity, habit/hack action clarity, solve action clarity, collaboration action clarity, and the like With continued reference to FIG. 1, action clarity may include EADEPPCTT action clarity. As used in the current disclosure, "EADEPPCTT action clarity" is data associated with methods, areas, or categories where a user can offload unnecessary tasks in order to promote the optimal flow state for the user. Each EADEPCTT related action or task may be used as an input to the machine learning model on a feedback loop. This may be done to ensure that each EADEPCTT action or task progresses the user towards the ultimate goal of achieving the optimal flow state.

With continued reference to FIG. 1, action clarity may include habit/hack clarity. As used in the current disclosure, "habit/hack clarity" is data associated with habits and/or hacks that promote that offer a short-cut to a result. In a non-limiting example, a habit/hack clarity may include a kettlebell high intensity interval training workout because it is a time efficient way to achieve one's health/fitness goal category versus other time consuming approaches. Computing device 104 may be configured to identify actions that are associated with habit/hack clarity by assessing domain targets 124 and comparing it to habits and hacks that may produce the desired result. Results may be submitted back into the computing device 104 or machine learning models as inputs on a feedback loop.

With continued reference to FIG. 1, action clarity may include solve action clarity. As used in the current disclosure, "solve action clarity" is data associated with a determination of when the user needs assistance to achieve an optimal flow state. Computing device 104 identify actions associated with a solve action clarity by identifying an immediate problem to solve or opportunity to capture that has either slowed flow state or accelerated flow state. Computing device 104 may identify the slowed progress towards a domain target 124 and inquire of the user if he/she has encountered an obstacle/problem. Solve action clarity may employ EADEPCTT action clarity to identify a solution to the given obstacle/problem. In some cases, when computing device 104 may identify an action that has progressed the user towards the optimal flows state computing device 104 may generate an inquiry for the user related to the new opportunity that will advance the user forward (and induce higher flow state) and then offer up action clarity.

With continued reference to FIG. 1, action clarity may include collaboration action clarity. As used in the current disclosure, "collaboration action clarity" is an identification of how a third-party contributes or detracts to achieving an optimal flow state. Third parties may either offer an additive aspect to flow state or a hinderance. Computing device 104 may generate a plurality of inquiries and suggestions to the user to identify the collaboration action clarity of the third party. Computing device 104 may consider the four dimensions of action clarity mentioned, and others introduced, to optimize the mix of and priority of the four methods to induce and maintain optimal flow state at a meta level.

Still referring to FIG. 1, setting a domain target 124 may additionally include identifying learning clarity. As used in the current disclosure, "learning clarity" is an identification of the manner by which a user learns best as it relates to achieving domain target, sub-target, or milestone. Learning clarity may refer to the different ways individuals prefer to approach learning and how they absorb, process, and retain information. Leaning clarity may include an identification of the manner in which a user learns best. Examples of learning clarity may include identifying the user's learning styles. Exemplary learning styles may include visual learners, auditory learners, kinesthetic leaners, reading/writing leaners, multimodal learners, social learners, and the like. Learning Clarity may include cultivating and harvesting the rich feedback loop of data around the user to accelerate progress toward the optimal flow state. In some cases, learning clarity may include five dimensions of learning clarity: progress learning clarity, insight learning clarity, interest learning clarity, brilliance learning clarity, and AI induced learning clarity.

With continued reference to FIG. 1, learning clarity may include progress learning clarity. As used in the current disclosure, "progress learning clarity" is data associated with recording user achievements. Progress learning clarity may include a description of why each achievement is valuable, and how it can be multiplied upon. Additionally, progress learning clarity may include an identification of what actions provide the user with the greatest boost towards learning clarity. In some embodiments, computing device 104 may be configured to generate a report, a story, or a video displaying the progress of the user. The report, story or video may also provide an illustration of how the progress of the user will look once the user achieves his/her desired goal. Conversely, if a report, a story, or a video may include a depiction of a user that did not align their given goal. This depiction may include a depiction of the possible consequences for the lack of achievement. The progress learning clarity may also include a measurement of the user's results compared to a variety of projected paths and generate tips, suggestions, and recommendations.

With continued reference to FIG. 1, learning clarity may include insight learning clarity. As used in the current disclosure, "insight learning clarity" is data related to capturing real time insights. In a non-limiting example, if the user in an optimal flow state, they may have clarity about what to EADEPCTT, what big breakthrough to pursue, what opportunities are at hand, what vitals in the application need fine tuning, what specifics are clearer, etc. Computing device 104 may be configured to identify such a state and inquire, from time to time ask the user to identify the contributing factors to the current state. Additionally, computing device 104 may accelerate learning by providing a suggestion to the user for a "pit stop." A pit stop may be used to encourage to user to record to any valuable feedback regarding flow state progress and or hindrances.

With continued reference to FIG. 1, learning clarity may include brilliance learning clarity. As used in the current disclosure, "brilliance learning clarity" is data associated with the inputs/suggestions of most prominent users in a given domain. These prominent users may be users who are noted experts and/or savants who achieve extraordinary results. These users may provide inputs/suggestions based upon comparison of the current user to the more proficient user in a given domain. Brilliance learning clarity may include pinpointing best practices and offering up such tips/suggestions and also integrates with the video course component of the as mentioned herein above. This may include providing the current user with images, photos, reports, or video clips of brilliant users being interviewed on domain specific topic. Brilliance learning clarity may accelerate the learning patterns of the user.

With continued reference to FIG. 1, learning clarity may include AI learning clarity. As used in the current disclosure, "AI learning clarity" is data associated user feedback. This may include user preference and user suggestions. The user's feedback may be used as training data for the various machine learning model mentioned herein. This is done to improve the machine learning model as the user continues to user the model.

With continued reference to FIG. 1, computing device 104 may be configured to determine the flow state of the user as a function of the domain target. As used in the current disclosure, a "flow state" is a high state of function where a user can intuitively perform in an optimal way that far exceeds non-flow state periods of performance. In an embodiment, a flow state may be defined by the rate or pace at which a user is achieving their goals. Processor may calculate the progress the user has made towards achieving aa domain target or sub-target by comparing what the user has accomplished according to the domain-specific data 120 to the domain target or sub-targets. The flow state of the user may be represented as a numerical score, alphanumeric score, and the like. In a non-limiting embodiment, the flow state of the user may be reflected using one or more linguistic identifiers. A linguistic identifier may provide an indication that a is in "the flow state" or is "not in flow state." Whether the user is in the flow state may be determined according to the user's pace when progressing towards a goal or according to a numerical score assigned to the user's goal. The Flow State of the user may be also measured in terms of optimal cadence and oscillation between domains and categories. The flow state of the user may include targeting a "healthy flywheel cadence" aligned with the target goals of the user in order to assist the user in avoiding over obsessing in one or more categories while potentially neglecting one or more other categories. Such flywheel cadence relates to the flow state of the user on a higher and broader level by offering up a cadence schedule that allows for focus in a small number of categories for a shorter period of time. A flywheel cadence may also be used to help the user stay on track and not neglect or abuse other categories. Computing device 104 may optimize such flywheel cadence for the user. In a non-limiting example, a healthy quarterly cadence may looks to optimize flow state for a specific 90-day (i.e. shorter term) period. Computing device 104 identify an optimal cadence for challenging goals in one to six categories to optimize flow state and optimize flywheel cadence. Computing device 104 may provide suggested areas to address if the user desires such input in a given short-term period.

Still referring to FIG. 1, in some embodiments, target-setting machine learning model 128 may receive input including domain-specific data 120a-n. As used in this disclosure, a "target-setting machine learning model" is a machine learning process that takes as input user data, such as domain-specific data, and generates at least a domain target. Target-setting machine learning model 128 may generate at least a domain target 124a-n as a function of domain-specific data 120a-n. In some embodiments, apparatus 100 may train target-setting machine learning model 128. In some cases, target-setting training data 132 may be input into a machine learning algorithm. Machine learning algorithm may include any machine learning algorithm described in this disclosure, including those referenced in FIGS. 4-7. As used in this disclosure, "target-setting training data" is a dataset that includes a plurality of domain-specific data correlated to a domain target. Domain-specific data and domain targets may be entered into target-setting training data manually, for example by a domain expert. In some cases, domain-specific data and domain targets may be derived for publications associated with a particular domain. Domain-specific data and domain targets may be derived from earlier instances of the apparatus 100 or the system's operation with other users or with a same user associated with a different domain. Apparatus 100 may train target-setting machine learning model 128 as a function of machine-learning algorithm and/or target-setting training data 132.

With continued reference to FIG. 1, computing device and/or processor may generate a representation 168 in a first space 172 as a function of user data 164. For the purposes of this disclosure, a "representation" is a presentation of data or information. For instance, and without limitation, representation may include a presentation or population of information related to an area of interest of the user. In one or more embodiments, first space 172 may include a first quantity of dimensions 176. For the purposes of this disclosure, a "first quantity of dimensions" is data or information regarding a schedule of a domain. In one or more embodiments, and without limitation, first quantity of dimensions 176 may include a schedule or plan related to an area of interest of the user. As used in this disclosure, a "schedule" or "user schedule" is a list of planned events with corresponding dates and times for a user. For example, and without limitation, a schedule may include one or more events, such as lessons, podcasts, e-books, third-party materials, lectures, and the like. In one or more embodiments, a schedule may include one or more goals of the user relating to any enumerated areas of interest, such as attaining a specific level of knowledge regarding divinity, professional advancement, intellectual stimulation, personal interests, socializing, and the like, as described above in this disclosure. In one or more embodiments, scheduling may include quizzes, lessons, questions, prompts, lectures, reading materials, and the like. In one or more embodiments, a schedule may include a lesson that occurs at predetermined time either once or repeatedly (e.g., daily, weekly, monthly, annually, and the like) for a predetermined amount of time. In one or more embodiments, a lesson of a schedule may be accessed using, for example, an application, a website, an external link, and the like. In one or more embodiments, a schedule may include one or In one or more embodiments, computing device and/or processor may generate representation 168 in a first space 172 using a machine-learning model. For instance, and without limitation, computing device may generate a representation, such as a user schedule 136 in a first space, for example, by using computing device 104. In some cases, computing device 104 and/or processor may generate representation 168 in first space 172 as a function of user data 164. More specifically, computing device 104 and/or processor may generate user schedule 136 as a function of one or more domain targets 124a-n and scheduling data 112. In some embodiments, user schedule 136 may include a daily schedule. In some cases, a daily schedule may include events or activities which are intended to help a user progress (and ultimately flourish) within at least a domain 116a-n. As used in this disclosure, a "daily schedule" is a schedule that spans a day, i.e., 24 hours. In some embodiments, user schedule 136 may include a weekly schedule. As used in this disclosure, a "weekly schedule" is a schedule that spans a week, i.e., seven days. In some embodiments, user schedule 136 may include a monthly schedule. As used in this disclosure, a "monthly schedule" is a schedule that spans a month, i.e., 29, 28, 30, or 31 days. In some cases, a monthly schedule may include events or activities which are intended to help a user progress (and ultimately flourish)

within at least a domain 116a-n. In some cases, apparatus 100 may generate user schedule 136 by using a machine-learning process, for example a representation machine-learning model 140. Representation machine-learning model 140 may including any machine-learning process described in this disclosure, including those described with reference to FIGS. 4-7. In some cases, representation machine-learning model 140 may include a neural network, such as neural networks described in this disclosure, for example with reference to FIGS. 5-6.

Still referring to FIG. 1, generating representation may include selecting a number of dimensions, such as a first quantity of dimensions 176 or a second quantity of dimensions 184. For example, and without limitation, selecting a number of dimensions may include selecting one dimensions per category of user data 164. In one or more embodiments, categories may corresponding to goals or attributes user desires to optimize (e.g., domain targets 124). For instance, and without limitation, user may want to optimize productivity, revenue or income, physical fitness, spirituality, and the like, as previously discussed in this disclosure. In one or more embodiments, a mapping machine-learning process may be used to map user data to vectors. Each vector may include an element corresponding to each dimension. In one or more embodiments, mapping machine-learning model may be generated using mapping training data. Mapping training data may include inputs that are correlated to outputs, such as a plurality of vector element inputs correlated to a plurality of dimension outputs. In one or more embodiments, training data may include data relating tasks to different types of categories. For instance, and without limitation, previous inputs and outputs of other users may be retrieved from a database by processor and used as mapping training data, where the tasks of the users are similar to the user's goals and tasks.

With continued reference to FIG. 1, mapping machine-learning model may create output vectors to represent the number of dimensions based on the domain targets and/or user data. A "vector" as defined in this disclosure is a data structure that represents one or more a quantitative values and/or measures a number of dimensions based off of domain targets. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Figure 4:
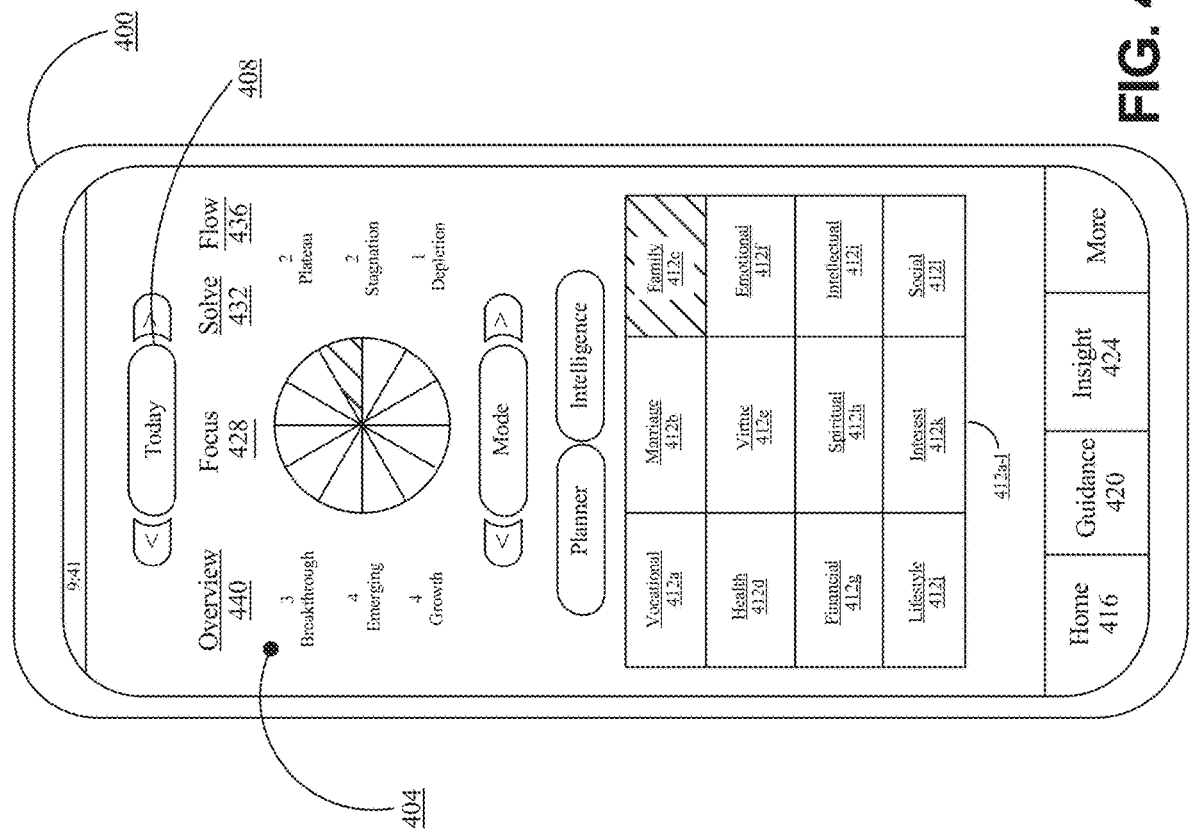
FIG. 4 is an exemplary remote device including an exemplary graphical user interface.

With continued reference to FIG. 1, in one or more embodiments, a surface may be generated to connect endpoints of the vectors of mapping machine-learning model. For instance, and without limitation, a surface may connect with line segments, splines, and the like. In one or more embodiments, first quantity of dimensions 176 may include a higher number of dimensions that second quantity of dimensions 184. In one or more embodiments, a geometric projection (e.g., representation defined by a fractal dimension), such as shown in FIGS. 2 and 4, may be provided by computing device or processor as a function of a neural network output (e.g., machine-learning module 700). For example, and without limitation, two orthogonal axes in the n-dimension that will maximize fractal dimension, minimize area, and the like.

Still referring to FIG. 1, in some embodiments, representation machine-learning model may receive inputs, such as user data, and output representation 168 in first space 172, which includes first quantity of dimensions 176. More specifically, in one or more embodiments, representation machine-learning model 140 may receive input including one or more of at least a domain target 124a-n and scheduling data 112. As used in this disclosure, a "representation machine-learning model" is a machine-learning process that that takes as input user data, such as scheduling data and domain target, and generates as output representation in first space, such as a schedule and a corresponding presentation of schedule. In one or more embodiments, apparatus 100 may generate user schedule 136 as a function of representation machine-learning model 140. In some embodiments, apparatus 100 may train representation machine-learning model 140. In some cases, training representation machine-learning model 140 may include inputting representation training data 144 to a machine learning algorithm. As used in this disclosure, "representation training data" is a dataset that includes a plurality of user data inputs, such as, for example, domain target inputs and/or schedule data inputs, correlated to representation in a first space outputs and/or first quantity of dimension outputs, such as, for example, schedule component outputs. In one or more embodiments, representation training data 144 may be manually provided, for example, by a domain expert or the user. In some cases, representation training data 144 may be derived from publications associated with a particular domain. In other embodiments, schedule training data 144 may include previous inputs and outputs of representation machine-learning model, where initial inputs and outputs of representation machine-learning model are used as updated training data to generate an updated representation machine-learning model. This may be continuously and iteratively done so that representation machine-learning model may be continuously and iteratively updated. Machine learning algorithm may include any machine learning algorithm described in this disclosure, for example those described with reference to FIGS. 4-7. As used in this disclosure, a "schedule component" is information that includes event data and temporal data. A schedule component may be included in a schedule. A schedule component may include a location. An exemplary schedule component is "kettle-bell workout, duration of 30 min, located at gym." Apparatus 100 may train representation machine-learning model 140 as a function of machine-learning algorithm. In some cases, representation machine-learning model 140 may be a function of one or more automated planning and scheduling algorithms. Additionally disclosure related to automated planning and scheduling algorithms may be found with reference to FIG. 4.

Figure 3:
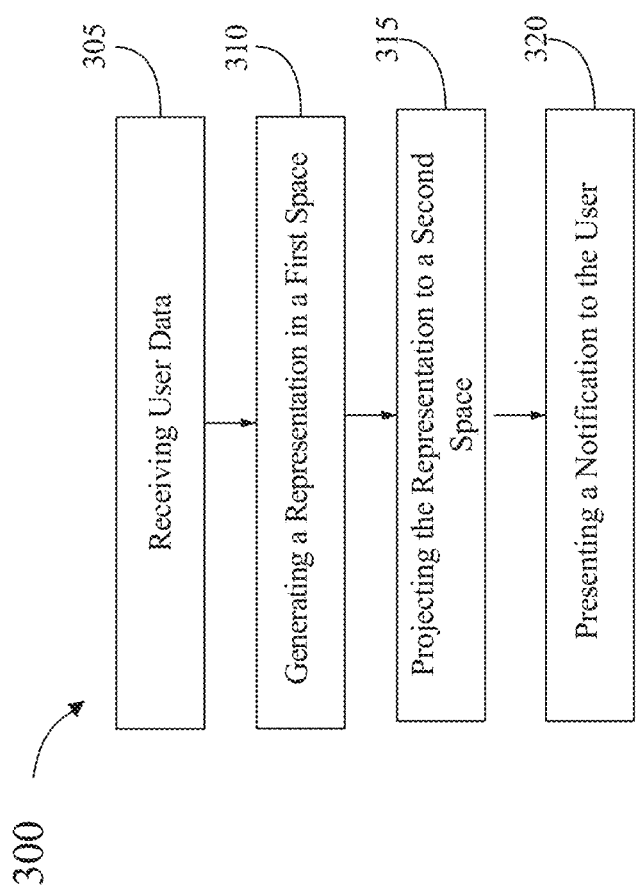
FIG. 3 is a flow diagram of an exemplary method of personalizing an interactive curriculum.

With continued reference to FIG. 1, computing device 104 and/or processor may display representation 168 in first space 172 using, for example, a display of computing device or of remote device 108. For instance, and without limitation, user schedule 136 and at least a domain target 124*a-n* user, for example, by way of remote device 108, may be displayed for the user to view. In some cases, remote device 108 may display to user by way of a graphical user interface (GUI). GUI may be presented to user as part of an application operating upon remote device. GUI may include text and graphics intended to communicate information as well as prompts and interfaces with which as user may input information. An exemplary GUI is illustrated in FIG. 3.

Still referring to FIG. 1, computing device 104 and/or process is configured to project representation 168 to a second space 180, where second space 180 includes a second number of dimensions 184. For the purposes of this disclosure, a "second quantity of dimensions" is updated data or information regarding the schedule of the domain. In one or more embodiments, a projection may include an idempotent mapping of a set into a subset, where one or more operations may be applied a plurality of times without altering a result beyond the initial application of the operations. For instance, and without limitation, projection may be used in database information retrieval. For example, and without limitation, if a user looks up a lesson for a particular date, the lesson plan will not be changed no matter how many times the request is submitted. In one or more embodiments, projecting a representation to a space, such as first or second space, may include dimensionality reduction. "Dimensionality reduction", for the purposes of this disclosure, may include a transformation of data or information from a high-dimensional space to a low-dimensional space. For example, and without limitation, an object having data representation in three dimensions (e.g., volume) may be reduced to a two-dimensional object having data representation in two dimensions (e.g., area) in a projection. The reduction in dimensionality may reduce cumbersome data analysis. Dimensionality reduction may include, and without limitation, feature selection, where feature selection includes determining a subset of input variable (e.g., attributes). In other embodiments, dimensionality reduction may include feature projection, where feature projection includes data transformations using linear or nonlinear approaches. dimensionality reduction may be performed prior to applying K-nearest neighbors algorithm, as described further in this disclosure. In non-limiting embodiments, projection may include a visual projection such as a parallel projection, such as an orthographic projection, oblique projection, axonometric projection, and so on, where a perspective of a visual representation is altered based on lines of sight from the object to the projection plane that are parallel to each other. In other non-limiting embodiments, projections may include perspective projections, where the perspective projection includes a nonlinear projection (e.g., foreground versus background). In one or more embodiments, second quantity of dimensions 184 may include evaluation results. As used in this disclosure, "evaluation results" are information originating from evaluation of update data. For instance, and without limitation, second quantity of dimensions 184 may include the user's progress in completion or adherence to the generated schedule. In one or more embodiments, second number of dimensions 184, or evaluation data, may include data related to the tracking of the user's progress in, for example, executing events. For example, and without limitation, second number of dimensions 184 may include a numerical value, such as a rate of progress of schedule, percentage of completion of schedule, consistency of execution of events, and the like. In one or more embodiments, tracking of the user's progress may include how much progress the user has made to maximize knowledge in an area of interest (e.g., domain). In one or more embodiments, the user may be prompted to provide feedback to gauge and assess how close a user is to achieving the user's goal in the area of interest.

Still referring to FIG. 1, second quantity of dimensions 184 may include a training video including one or more recommendations for achieving completely or at least partially domain target. In one or more embodiments, second quantity of dimensions 184 may include an animation. For instance, and without limitation, representation may include an encouragement animation, such as an applause animation or a confetti animation that appears when there is a positive change in progression of achieving a domain target. In one or more embodiments, second quantity of dimensions 184 may indicate a domain sub-target acquisition, where a domain sub-target comprises at least an action or task that advances a user toward achieving domain target. In one or more embodiments, second quantity of dimensions 184 may include information notifying user of the achievement of one or more domain sub-targets, an explanation regarding the importance of achieving the domain sub-target, a recommendation for building upon the domain sub-target, a reward, and so on. For instance, and without limitation, a recommendation for building upon domain sub-target may include a recommendation for achieving a subsequent sub-target (e.g., instructions for how to achieve a second domain sub-target after achieving a first domain sub-target). second Quantity of dimensions 184 may include a visual indication or illustration of progression toward achieving a domain target may include a meter or indicator that includes a visual representation showing the progress of a user toward achieving domain target and/or corresponding domain sub-targets. For instance, and without limitation, second quantity of dimensions 184 may include a meter having an indicator that shows a percentage or qualitative and/or quantitative value related to progression. In other embodiments, second quantity of dimensions 184 may also include a countdown meter that shows a time duration or remaining value until a domain target its achieved. In other embodiments, second quantity of dimensions 184 may include a flywheel.

With continued reference to FIG. 1, in one or more embodiments, computing device 104 and/or processor may interrogate user for update data 148 to project second number of dimensions. For example, and without limitation, user may input update data using remote device 108. As used in this disclosure, "update data" is information derived or received from user after generation of representation 168 in first space 172. For instance, and without limitation, update data may include updated user data, such as schedule data or domain data. For example, and without limitation, update data may be derived or received from the user after generation of one or more of at least a user schedule and at least a domain target. In some cases, update data may be useful in determining a user's adherence to a user schedule or progress toward a domain target. In some cases, apparatus 100 may receive update data 148 automatically, for example, without knowledge of or instruction from the user. For example, in some cases, update data 148 may be ascertained from data detectable by remote device, e.g., location data, screen time, application time, and the like. In some cases, update data 148 may include objective update data 148. As used in this disclosure, "objective update data" is update data that is objective in quality, for example amount of time a user spent undertaking an event on user schedule. In some cases, update data 148 may include subjective update data 148. As used in this disclosure, "subjective update data" is update data that is subjective in quality, for example how a user rates changes to their social life may be subjective update data relating to a social domain. In some embodiments, computing device 104 and/or processor may evaluate update data 148 as a function user schedule 136 and/or domain target 124a-n. Evaluating update data 148 may yield evaluation results 152. In some cases, apparatus 100 may display evaluation results 152 to user, for example by way of remote device 108 and/or a graphical user interface.

Still referring to FIG. 1, an evaluating machine learning model 156 may be used to project representation 168 of user data to second space 180. For instance, and without limitation, evaluating machine learning model 156 may be used to project second quantity of dimensions 184. For example, and without limitation, computing device 104 and/or processor may project update data 148 using an evaluating machine learning model 156. As used in this disclosure, an "evaluating machine learning model" is a machine learning process that takes updated user data and generates second number of dimensions. For example, and without limitation, evaluating machine learning process may take update data as input and generate evaluation results.

Computing device 104 may input one or more of update data 148 and user schedule 136 to an evaluating machine learning model 156. Computing device 104 may generate evaluation results 152 as a function of evaluating machine learning model 156. In some embodiments, apparatus 100 may train evaluating machine learning model 156 using evaluating training data 160. As used in this disclosure, "evaluating training data" is a dataset that includes a plurality of update data correlated to evaluations. Update data and evaluations may be entered into evaluation training data manually, for example by an evaluation expert. In some cases, update data and evaluations may be derived for publications associated with a particular domain. Update data and evaluations may be derived from earlier instances of the apparatus 100 or the system's operation with other users or with a same user associated with a different domain. In some cases, evaluating training data may include a plurality of update data and at least a domain correlated to evaluations. In some cases, an evaluation may be representative of an association between a domain status and a domain target. Computing device 104 may input evaluating training data 160 to a machine learning algorithm. Machine learning algorithm may include any machine learning algorithm, for example those disclosed with reference to FIGS. 4-7. Computing device 104 may train evaluating machine learning model 156 as a function of machine-learning algorithm.

Still referring to FIG. 1, in some embodiments, computing device 104 and/or processor may generate a notification 188, which may be transmitted to the user. Notification 188 may be sent to the user to notify the user of progress. For example, and without limitation, notification 188 may include information regarding one or more events of the schedule. For instance, and without limitation, notification 188 may notify the user that one or more lessons have not been completed within a predetermined duration of time. In one or more embodiments, notification may include such as, for example, progress, updated goals, areas of interest, new events, and the like. In one or more embodiments, computing device 104 and/or processor may notify user as a function of evaluation results 152. In some cases, apparatus 100 may notify user using remote device 108. Apparatus 100 may notify user by way of an application and/or a graphical user interface running on remote device. Alternatively or additionally, in some cases, remote device 108 may include text messaging capabilities and apparatus 100 may notify user by way of a text message. As used in this disclosure, a "text message" is message communicated by way of one or more of short message service (SMS) and multimedia messaging service (MMS). In some embodiments, notifying a user may include a notification on remote device. In one or more embodiments, a notification may include an interrupting alarm, for example, facilitated by background operation of a graphical user interface. In some cases, a notification may be first authorized by user, for example through use of remote device 'settings.' In some cases, notifications may be disabled to avoid disruption and/or interruption. As used in this disclosure, an "authorized notification" is a notification which has been authorized.

Still referring to FIG. 1, computing device 104 and/or processor may be configured to generate an interface query data structure 192. For the purposes of this disclosure, an "interface query data structure" is an interface configured to receive an input of a user. In one or more embodiments, interface query data structure 192 may receive a user input. In one or more embodiments, interface query data structure 192 may include one or more prompts or questions that a user may respond to. For example, and without limitation, interface query data structure 192 may be shown in a display of computing device and/or remote device 108, which the user may use to input any data described in this disclosure, such as user data, updated user data, and the like. For example, and without limitation, apparatus 100 may allow a user to modify a schedule using interface query data structure 192. For example, in some cases, user schedule 136, which may be autogenerated, is not practical or otherwise acceptable to a user. In this case, the user may submit a schedule change request, for example, from remote device 108 by inputting limitations or updated user data into interface query data structure 192. In one or more embodiments, user input may include a schedule change request. As used in this disclosure, a "schedule change request" is information that includes a modification to a user schedule. Computing device 104 and/or processor may receive at least a schedule change request from user. Computing device 104 and/or processor may modify at least a user schedule as a function of schedule change request, which is inputted via interface query data structure. Exemplary schedule change requests may include commands to change a time of a schedule component, change a location of a schedule component, change an invite list of a schedule component, change an event/activity of a schedule component, a schedule component, and add a schedule component. In some cases, a schedule change request may include a request to change a prioritization or inclusion of at least a domain 116a-n. In some cases, a schedule change request may cause a regeneration of user schedule 136, for example, by using one or more machine learning processes (e.g., representation machine-learning model 140 or evaluating machine learning model 156).

Still referring to FIG. 1, in one or more embodiments, computing device 104 and/or processor may be configured to determine a fractal dimension 196 of projected representation 168. In one or more embodiments, a "fractal dimensions" includes a geometric analysis of varying complexities of a representation. In one or more, embodiments, fractal dimension 196 may include a visual representation of a graphical user interface. For instance, and without limitation, fractal dimension may include a high statistical index of complexity such that a complex table with numerous data points is presented to user using display. In another instance, and without limitation, fractal dimension may include a low statistical index of complexity such that a simplified table with few data points is presented to user using display. In one or more embodiments, fractal dimension of projected representation may include a shape with a boundary. For example, and without limitation, fractal dimension may define a rectangle having a particular number of boxes disposed therein, where each box containing any data described in this disclosure. In another non-limiting embodiment, fractal dimension may define a hexagonal shape with delineations defined therein, each of which containing any information described in this disclosure. Fractal dimensions may be determined as a function of the number of first dimensions and second dimensions. For example, and without limitation, fractal dimension shape may be determined by the quantity or category of dimensions. For instance, and without limitation, if the total number of dimensions is four, then fractal dimensions may be determined to create a rectangular table with at least four boxes disposed therein, each box containing a dimension of the four dimensions. In one or more embodiments, fractal dimensions may be calculated as a function of the first and/or second quantity of dimensions. In one or more embodiments, updated fractal dimensions may be calculated as a function of proposed modifications that may reduce the fractal dimension of a representation. Thus, a representation, such as a calendar or schedule of a user, is too complex, updated data may be provided to processor to alter the fractal dimension of the representation and better organize the schedule.

Still referring to FIG. 1, computing device 104 and/or processor may be configured to classify representation 168 and projected representation 168 to a category. A "category", for the purposes of this disclosure, comprises a class describing data. For example, and without limitation, Classification of representation 168 and projected representation 168 may include classifications based on situations, advice, or other strategies. Classifier may include any classifier described in this disclosure, for example a clustering algorithm (e.g., K-means clustering algorithm, particle swarm optimization, and the like). For instance, and without limitation, computing device 104 and/or processor may include a machine learning process configured to identify effective ways to motivate user. In some cases, machine learning process may include a trained machine learning model. In some cases machine learning model may be trained using training data correlating previous outputs (e.g., user schedule, domain targets, and the like) to subsequent updates for users generally. Alternatively or additionally, in some case, machine learning model may be trained using training data correlating previous outputs to updates for an individual user or a class (i.e., cohort) of similar users.

Still referring to FIG. 1, in some embodiments, computing device 104 may compute a score associated with representation 168 (e.g., representation of a schedule) and suggest a recommended action to optimize representation 168 (e.g., recommended actions of user to minimize and/or maximize the score), depending on whether an optimal result is represented, respectively, by a minimal and/or maximal score; a mathematical function, described herein as an "objective function," may be used by computing device 104 to score each possible pairing. Objective function may be based on one or more objectives as described below. In various embodiments a score of a schedule may be based on a combination of one or more factors, including a number of tasks, a deadline, one or more duration of the tasks, or the like. Each factor may be assigned a score based on predetermined variables. In some embodiments, the assigned scores may be weighted or unweighted. Optimization of objective function may include performing a greedy algorithm process. A "greedy algorithm" is defined as an algorithm that selects locally optimal choices, which may or may not generate a globally optimal solution. For instance, computing device 104 may select an optimal schedule so that has the best score of the one or more candidate schedules. In such an example, optimization may determine the combination of routes such that each delivery pairing includes the highest score possible. In some embodiments, objective function may be formulated as a linear objective function, which computing device 104 may solve using a linear program such as without limitation a mixed-integer program. A "linear program," as used in this disclosure, is a program that optimizes a linear objective function, given at least a constraint. For instance at least a constraint may be any pre-existing schedule conflicts for a particular user. In various embodiments, apparatus 100 may determine an optimal schedule that maximizes a total score subject to any pre-existing schedule conflicts for a particular user. A mathematical solver may be implemented to solve for a number of tasks, a deadline, one or more duration of the tasks, or the like that maximizes scores; mathematical solver may implemented on computing device 104 and/or another device in apparatus 100, and/or may be implemented on third-party solver. Further, optimizing objective function may include minimizing a loss function, where a "loss function" is an expression an output of which an optimization algorithm minimizes to generate an optimal result. As a non-limiting example, computing device 104 may assign variables relating to a set of parameters, which may correspond to score components as described above, calculate an output of mathematical expression using the variables, and select an optimal schedule that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Referring now to FIG. 2, exemplary domains 200 are illustrated by way of a table. As can be seen domains may include vocational 204, marriage 208, family 212, health 216, virtue 220, emotional 224, financial 228, spiritual 232, intellectual 236, lifestyle 240, interest 244, and social 248 to name a few. Each domain 200 may have a status. Exemplary, non-limiting statuses include breakthrough, emerging, growth, plateau, stagnation, and depletion to name a few. In some cases, a domain status may be determined according to one or more state variables. State variable may be affected by objective data and/or subjective data. Exemplary non-limiting examples of objective data include medical measurements, time spent on certain activities, events participated in, number of steps taken, and generally speaking anything that can be measured. In some cases, remote device may directly measure or infer objective data, for example remote device may measure number of steps taken by user, amount of screen time, and the like. Alternatively or additionally objective data may be input by user into remote device. For example, a user may include user weight, user blood pressure, or any other objective datum by way of remote device. In some cases, user may input subjective data, for example by way of remote device. Subjective data may include a numerical representation (e.g., 1-10 rating) of how a user thinks or feels about a current aspect relating to a domain. For example, and without limitation, a user may rate a level of anxiety, a level of fulfillment, or the like. In an embodiment, one or more domains may be selected and/or isolated by a user. This may allow for a more focused and concentrated experience on one or more domains of interest to a user. In an embodiment, a user may select one or more domains to isolate and/or focus on. In yet another non-limiting example, computing device 104 may select one or more domains for a user to focus on, using a selection process that may include one or more machine learning processes as described throughout this application.

With continued reference to FIG. 2, at least a domain may include vocational domain 204. Objective data that may be associated with vocational domain includes title, role, responsibility, compensation, and the like. Subjective data may include a rating of user's level of vocational fulfillment. A domain target associated with vocational domain 204 may include a change in a subjective or objective datum associated with the vocational domain 204. Schedule components or events that may be added to exploit value in vocational domain 204 include professional training events, maximizing contribution, exploiting opportunities, and the like.

With continued reference to FIG. 2, at least a domain may include marriage domain 208. Objective data that may be associated with marriage domain includes amount of time spent with spouse, for example time spent enjoying one another. Subjective data may include a rating of user's level of marriage fulfillment. A domain target associated with marriage domain 208 may include a change in a subjective or objective datum associated with the marriage domain 208. Schedule components or events that may be added to exploit value in marriage domain 208 include events determined to maximize marriage fulfillment, including participating in couple centric events, self-sacrificial acts of love, couples therapy, honest communication sessions, and the like.

With continued reference to FIG. 2, at least a domain may include family domain 212. Objective data that may be associated with family domain includes amount of time spent with family. Subjective data may include a rating of user's level of family fulfillment or a rating of a family member's level of fulfillment with user/spouse. A domain target associated with family domain 212 may include a change in a subjective or objective datum associated with the family domain 212. Schedule components or events that may be added to exploit value in family domain 212 include events determined to maximize family fulfillment, including participating in family events, self-sacrificing acts of love, generosity of time, money, and service, and the like.

With continued reference to FIG. 2, at least a domain may include health domain 216. Objective data that may be associated with health domain includes medical data, such as without limitation body mass index, blood pressure, resting heart rate, blood oxygen content, and the like. Subjective data may include a rating of user's level of health fulfillment, a rating of number of activities a user feels are impaired by health concerns, a rating of overall concern with health, and the like. A domain target associated with health domain 216 may include a change in a subjective or objective datum associated with the health domain 216. Schedule components or events that may be added to exploit value in health domain 216 include events determined to maximize health fulfillment, exercise, nutritional meals, visits to medical professionals, and the like.

With continued reference to FIG. 2, at least a domain may include virtue domain 220. Objective data that may be associated with virtue domain includes amount of time acting virtuously, proportion of big decisions which are aligned with desirable virtues, amount of success or failure living within targeted virtue levels, evidence of retained or unretained resolve, and the like. Subjective data may include a rating of user's self-perceived level of virtue or a rating of user's perceived level of virtue from another. A domain target associated with virtue domain 220 may include a change in a subjective or objective datum associated with the virtue domain 220. Schedule components or events that may be added to exploit value in virtue domain 220 include events determined to maximize virtue fulfillment, including participating habit building exercises designed to facilitate consistently good decision making.

With continued reference to FIG. 2, at least a domain may include emotional domain 224. Objective data that may be associated with emotional domain includes amount of time spent in a state of emotional destress, amount of time in emotional harmony, amount of time sleeping, caloric intake, amount of time engaged in anxiety about the past or imagined future, and the like. Subjective data may include a rating of user's level of emotional fulfillment. A domain target associated with emotional domain 224 may include a change in a subjective or objective datum associated with the emotional domain 224. Schedule components or events that may be added to exploit value in emotional domain 224 include therapy, treatment under the supervision of health care professionals, events and exercises that are likely to improve a user's emotions, and the like.

With continued reference to FIG. 2, at least a domain may include financial domain 228. Objective data that may be associated with financial domain includes amount of financial assets possessed by user. Subjective data may include a rating of user's sense of financial security independence and freedom. A domain target associated with financial domain 228 may include a change in a subjective or objective datum associated with the financial domain 228. Schedule components or events that may be added to exploit value in financial domain 228 include meeting with a financial advisor, increasing savings contributions, budgeting, and the like.

With continued reference to FIG. 2, at least a domain may include intellectual domain 236. Objective data that may be associated with intellectual domain includes amount performance in intellectual pursuits, such as graded performance in school. Subjective data may include a rating of user's level of intellectual fulfillment. A domain target associated with intellectual domain 236 may include a change in a subjective or objective datum associated with the intellectual domain 236. Schedule components or events that may be added to exploit value in intellectual domain 236 include events determined to maximize intellectual fulfillment, including enrolling in educational programs, enjoying cultural events, and the like.

With continued reference to FIG. 2, at least a domain may include lifestyle domain 240. Objective data that may be associated with lifestyle domain includes amount of time spent in ideal or unideal lifestyle settings. Subjective data may include a rating of user's level of lifestyle fulfillment. A domain target associated with lifestyle domain 240 may include a change in a subjective or objective datum associated with the lifestyle domain 240. Schedule components or events that may be added to exploit value in lifestyle domain 240 include events determined to maximize lifestyle fulfillment, including housing, travel, wardrobe, toys, activities, groups and free time.

With continued reference to FIG. 2, at least a domain may include interest domain 244. Objective data that may be associated with interest domain includes amount of time on avocational pursuits or personally enjoyable activities. Subjective data may include a rating of user's level of interest fulfillment. A domain target associated with interest domain 244 may include a change in a subjective or objective datum associated with the interest domain 244. Schedule components or events that may be added to exploit value in interest domain 244 include events determined to maximize interest fulfillment, including hobbyist events, and the like.

With continued reference to FIG. 2, at least a domain may include social domain 248. Objective data that may be associated with social domain includes amount of time spent with others in a social setting, for example time spent enjoying one another. Subjective data may include a rating of user's level of social fulfillment. A domain target associated with social domain 248 may include a change in a subjective or objective datum associated with the social domain 248. Schedule components or events that may be added to exploit value in social domain 248 include events determined to maximize social fulfillment, including participating in social events, engaging with a club, friends, groups, entertainment events, and the like.

Referring now to FIG. 3, a flow diagram of a method 300 of generating projections of representations of data in a plurality of spaces. For instance, method 300 may include personalizing an interactive curriculum by generating a visual representation of the schedule on a graphic user interface, as previously mentioned. At step 305, method 300 may include receiving user data. User data may be received from a remote device by a computing device. In some instances, the user data may include scheduling data, domain-specific data, or both. User data may be input to remote device via a questionnaire, a series of prompt, an application, a calendar and/or any combination thereof. A user may input user data into a remote device manually, automatically, or both. For example, user may input user data by filling out a questionnaire. Additionally, a user may enable automatic access to the user's calendar such that scheduling data is automatically sent to a computing device. In some embodiments, method 300 may include identifying at least a domain target for an at least domain. As mentioned herein, at least a domain target may be associated with one or more domains shown in FIG. 2. In some instances, at least a domain target may be correlated to outputs that include schedule components or user schedules. For example, at least a domain target maybe correlated to a candidate schedule. In some instances, at least a domain target may be a specific goal or target that a user desires to accomplish with a predetermined time period. At least a domain target may be identified by inputting domain-specific data into a domain target machine learning model where the outputs may be at least a domain target.

Still referring to FIG. 3, at step 310, at step 310, method 300 may include generating, by the computing device, a representation in a first space as a function of the first data, wherein the first space comprises a first quantity of dimensions, wherein generating the representation in the first space comprises selecting a number of dimensions of the first quantity of dimensions. In one or more embodiments, representation may include a user or candidate schedule. A "candidate schedule" is defined herein as a potential schedule for a user; a candidate schedule may be produced and/or defined as a function of domain-specific data and scheduling data. For example, domain-specific data may indicate that a user may be interested in multiple domains. In view of this, it may be desired to generate a one or more candidate schedule for each domain that is indicated in domain-specific data. As such, a computing device may in fact generate one or more candidate schedules as a function of domain-specific data. It should be noted that each generated candidate schedule may include a plurality of lessons related to a domain corresponding to respective domain-specific data. In some instances, generating a plurality of candidate schedules may include receiving representation training data that correlates domain-specific data to scheduling data. Representation training data may then be used to train a representation machine-learning model as a function of representation training data. Further, scheduling data may be input into a representation machine-learning model to output a plurality of candidate schedules as a function of domain specific data and scheduling data. For example, an input of representation training data may be domain-specific data It should be noted that a plurality of candidate schedules may be associated with one or more domains as described herein. In one or more embodiments, generating the representation includes receiving representation training data correlating user element inputs to representation element inputs, training a representation machine-learning model as a function of the representation training data, and generating the representation as a function of the user data and the representation machine-learning model.

Still referring to FIG. 3, at step 315, method 300 may include projecting, by the computing device, the representation to a second space, wherein the second space comprises a second quantity of dimensions. In one or more embodiments, projecting the representation to a second space comprises presenting, by the computing system at the remote device, a graphic showing the user's completion percentage of the plurality of lessons, wherein the graphic is a chart.

Still referring to FIG. 3, at step 320, method 300 includes presenting, by the computing device at a remote device, a notification to the user related to the projection. In one or more embodiments, a user schedule may be presented at a remote device. A user schedule may be presented at a remote device via an application, a photo, through a calendar, and/or any combination thereof. A user may be able to integrate a plurality of lesson included in a user schedule into a pre-existing calendar. In some instances, a user schedule may be presented on an interactive graphical user interface (GUI) of a remote device such that a user may input one or more indications of completion, incompletion, or both.

In one or more embodiments, method 300 may includes tracking a user's progress with regard to user schedule. As used in this disclosure, a "user's progress" is a user's forward advancement towards a goal within one or more domains. In some embodiments, tracking a user's progress may include tracking the user's progression through plurality of lessons included in user schedule. For example, user schedule may include a plurality of lessons associated with at least a domain. A plurality of lessons may include in person lessons, online lessons, or both. When tracking a user's progression with an online lesson, it may be advantageous to enable a computing device to have access to a remote device's activity. This can be done by tracking a remote device's battery percentage, network usage, anytime, and/or any combination thereof, in some instances, a plurality of lessons may be within an application on a remote device. In some embodiments, a computing device may track a user's progression as a function of login data on an application on a remote device. That is, a user may log in to complete at least one lesson of a plurality of lessons and there may be a time of completion associated with the lesson of the plurality of lessons. It should be noted that "time of completion" is defined herein as an amount of time a lesson of a plurality of lessons is live and/or in progress. For example, a time of completion may be 15 minutes, 30 minutes, 1 hour, or any suitable time interval. As such, login data may be compared to a time of completion associated with a lesson of a plurality of lessons to determine a sufficient amount of completion of the lesson. In some instances, a computing device may send a periodic data scan to a remote device as a function of user schedule. For example, a computing device may send a scan to a remote device 5 minutes, 10 minutes, 15 minutes, or any suitable time after a lesson of a plurality of lessons is scheduled to be completed. A computing device may then determine if there is a user was logged in long enough to complete a lesson by comparing to a time of completion of the lesson to a time that the user was logged in.

Still referring to FIG. 3, a periodic data scan may scan a remote device for location data, application data, Bluetooth data, connectivity data, or any combination thereof. A periodic data scan may be used to gather information relating a user to a lesson. For example, periodically scanning a remote device before and after a lesson begins and ends may enable a computing device to gather sufficient data to determine whether a user attended and/or completed the lesson.

In some embodiments, a lesson may be delivered in person via a classroom setting, a seminar setting, a conference, or any setting of the like. In some instances, a computing device may have access to location services on a remote device associated with a user. "Location services" on a remote device is a tracking mechanism that tracks a physical location of the remote device. Typically, a remote device is either on a user's person or at least near the user, so location services on a remote device may offer a reasonable approximate location of the user. In some instances, location services on a remote device may utilize a global positioning system (GPS), cell tower triangulation, mapping programs, global navigation satellite system (GLONASS), Wi-Fi signal proximity, or the like. As such, a computing device may be able to track when and where a remote device is, and consequently, when and where a user, associated with the remote device, is. In some instances, a computing device may track a remote device's location to determine a time interval in which the remote device has been in a certain location. A determined time interval may then be compared to a duration of an in-person lesson to determine whether a user attended the in-person lesson partially, or in its entirety. A computing device may then determine if a user has completed a sufficient amount of an in-person lesson.

In any instance, it may be beneficial to present at least a graphic to a user via a remote device, illustrating user's progress. As described herein, there may be various methods of tracking a user's completion and progress of a plurality of lessons. In addition to tracking a user's progress, a computing device may also present at least a graphic to a user via a display on a remote device. An at least a graphic may include a plurality of lessons and their respective completion statuses. In addition, a computing device may compile completion statuses of a plurality of lessons to generate a comprehensive progression chart regarding at least a domain. In this way, a user may see how well they are progressing through a plurality of lessons. An at least a graphic may include a representation of a user's progress as a chart/graph, a checklist, a marked-up calendar, or any suitable way to represent progress. It should be noted that at least a graphic may be specific to at least a domain; meaning that each domain may have a graphic associated with it. Additionally, at least a graphic may include representations of progress from multiple domains. Thus, a full perspective of a user's progress through their respective curriculums may be presented via at least a graphic.

In some embodiments, a plurality of lessons associated with at a least a domain may be a have a predetermined time in which they need to be complete. For example, a plurality of lessons may include 5 lessons that occur every other day. Continuing that example, if a first lesson of a plurality of lessons is scheduled to begin on a Monday, then a user would have a lesson to complete on Monday, Wednesday, Friday, Sunday, and finally, the following Tuesday. However, an additional time period (e.g., 1 day, 3 days, 1 week, 2 weeks) may be included in a predetermined time in which the plurality of lessons need to be completed. As a non-limiting example, this may allow a user time to make up one or more missed lessons before a final determination of whether a user has successfully completed at least a domain. For clarity's sake, a predetermined time to complete a plurality of lessons may include both a time interval in which the lessons are scheduled, as well as an additional time period.

Referring now to FIG. 4, an exemplary embodiment of a remote device 400 is illustrated. In some cases, remote device 400 may interface with user by way of a graphical user interface (GUI) 404. In some cases, remote device 400 may display to user a schedule 408, such as without limitation a weekly schedule. In some cases, schedule 408 function allows a user to view and edit a user schedule. In some embodiments, schedule 408 may be an user schedule generated using a computing device, such as, for example, user schedule 136 and computing device 104 discussed with reference to FIG. 1. In some cases, remote device 400 may display to user domains 412a-1. In some cases, progress (e.g., evaluation results) related to a domain may be represented by GUI, such as by way of color coding. For example, family domain 412c is indicated with hashmarks to indicate that family is an undesirable (e.g., depleted) status. In some cases, a status for each domain may be indicated to user by way of GUI 404, for example in an " " view 416. In some cases, GUI may allow user access to resources. In some cases, resources may be domain specific. Exemplary resources include guidance 420 and insight 424. Guidance 420 may include any audio information designed to enrich a user, for example within a specific domain. Insight 424 may include any media, such as video, text, and the like intended to enrich a user, for example within a specific domain. Focus 428 may isolate one or more domains that may aid in a more focused and concentrated experience to assist in driving change and progress. Solve 432 may include a scheduled focus for a particular period of time such as a day, week, month, quarter, year, and the like. Solve 432 may display information pertaining to particular issues and problems to solve and may aid in selecting one or more breakthrough domains. Flow 436 may include habits, projects, rocks, and to-dos that may be aligned with a user's priorities and interests. Overview 440 may include a big picture view of domains, realms, and/or categories. Notebook and/or intelligence may include one or more digital copies of handwritten tools that may be integrated and automatically updated and available within graphical user interface 404.

In some embodiments, GUI 404 may enable a user to interact with specific resources of a domain. For example, when a user interacts with home 416, GUI 404 may illuminate domains 412a-1 with different colors based at least on a status of each domain. Additionally, one or more domains may be considered as an undesirable status (e.g., depleted). As described in the above example, FIG. 4 illustrates family domain 412c being depleted. In some embodiments, display box for family domain 412c may be pulsating. That is, display box for family domain 412c may appear to rise and fall into the plane of GUI 404. This may draw a user's attention to family domain 412c. The pulsating feature may be especially beneficial for users with sight problems such as color blindness. In some embodiments, display box for family domain 412c may be interacted with and maximized to a full screen mode. While in full screen, a plurality of lessons and their respective completion statuses may be displayed. It should be noted that the full screen capability may be available upon interacting with any domain display box and is not limited to undesirable status domains. In some embodiments, full screen mode may be an automatic response to a user interacting with home 416. For example, a user may interact with home 416 and in response to the user's interaction, a full screen mode of one or more undesirable status domains, with their respective plurality of lessons and completion statuses, will be displayed.

Figure 5:
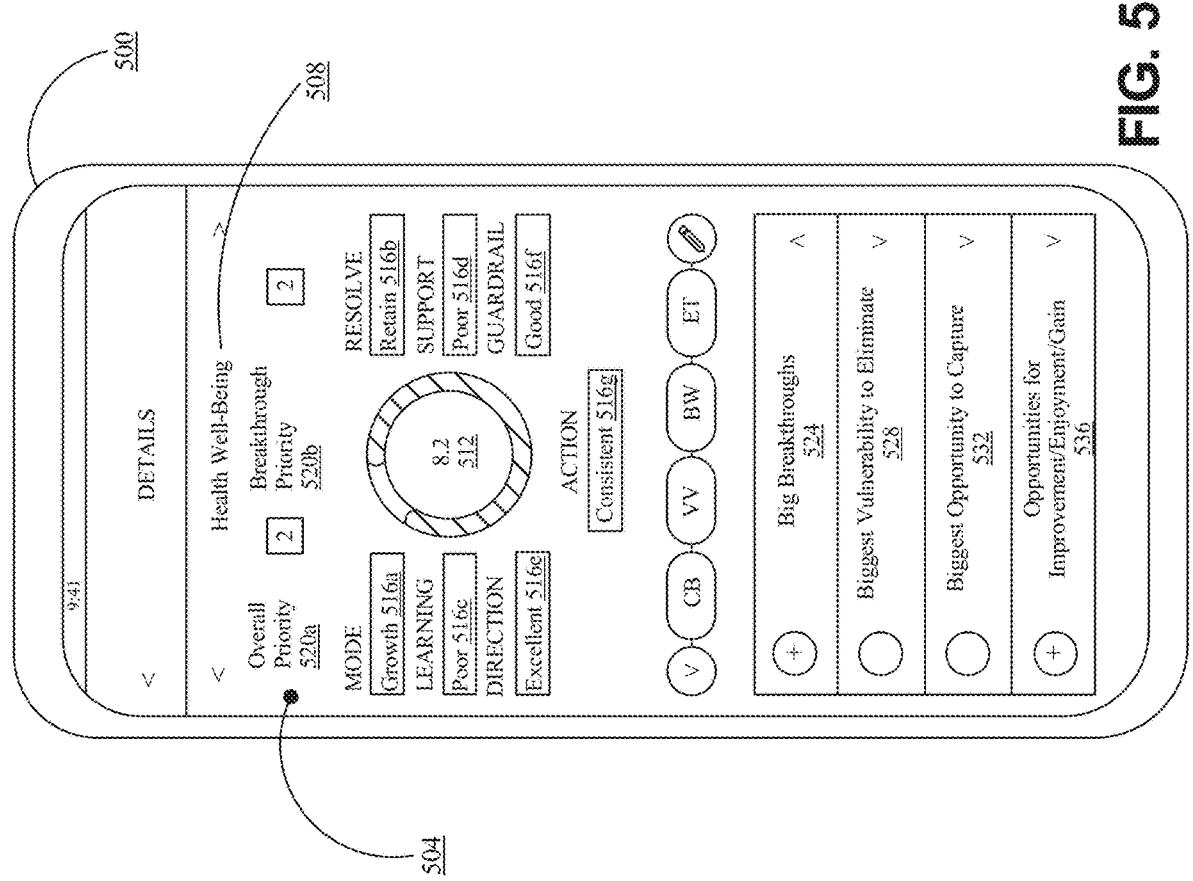
FIG. 5 is an exemplary remote device including an exemplary graphical user interface.

Referring now to FIG. 5, an exemplary display on a remote device 500 is illustrated. In some cases, remote device 500 may interface with user by way of a graphical user interface (GUI) 504. In some cases, remote device 500 may display domain-specific information 508, for instance information related to health domain. In some cases, an overall domain-specific rating 512 (i.e., evaluation result) may be presented to user. In some embodiments, rating 512 may be updated in real-time. For example, user may be completing a lesson of a plurality of lessons while interaction with GUI 504. Once user completes a sufficient portion of the lesson of the plurality of lessons, rating 512 may be increased or lowered. Additionally, subordinate domain-specific ratings (i.e., evaluation results) 516a-g may be presented to user. In some embodiments, the subordinate domain-specific ratings 516a-g may be calculated as a function of domain targets, such as, for example, domain targets 124a-n discussed with reference to FIG. 1. As a non-limiting example, if a user has not met a domain target, this may negatively impact the corresponding subordinate domain-specific rating 516a-n. As another non-limiting example, if a user has exceeded a domain target, this may positively impact the corresponding subordinate domain-specific rating 516a-n. For example, subordinate domain-specific ratings may be related to mode 516a, resolve 516b, learning 516c, support 516d, direction 516e, guardrail 516f, action 516g, and the like. In some cases, a domain may be prioritized, for example with an overall priority 520a and/or a breakthrough priority 520b. In some cases, domain-specific information may be enumerated and/or prioritized. Exemplary enumerations and/or prioritizations include without limitation big breakthroughs 524, biggest vulnerability to eliminate 528, biggest opportunity to capture 532, opportunities for improvement/enjoyment/gain 536, and the like. Further, subordinate domain-specific ratings 516a-g may be updated in real time in response to rating 512 being updated. This may enable user to have the most current status of their progress within a certain domain.

Figure 6:
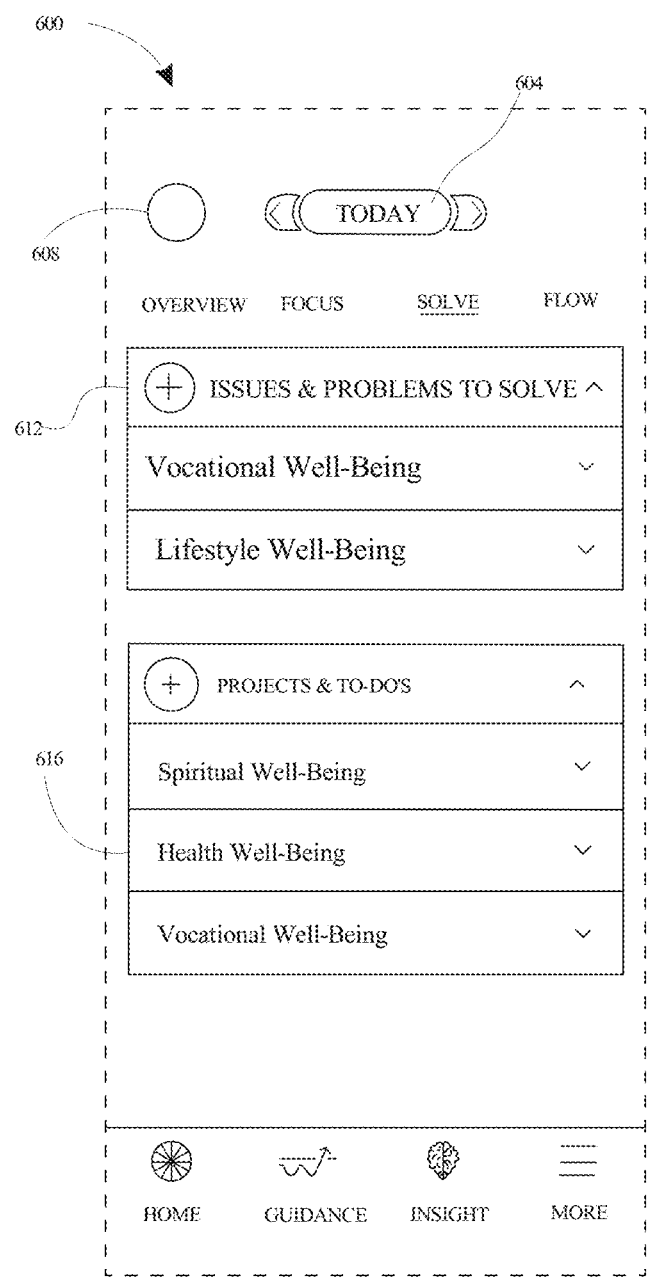
FIG. 6 is an exemplary remote device including an exemplary graphical user interface.

Referring now to FIG. 6, an exemplary embodiment of a user interface 600 on a remote device is illustrated. In some cases, remote device may interface with user by way of a graphical user interface (GUI). In some cases, remote device may display domain-specific information, for instance information related to one or more domain target. In some cases, one or more suggested videos and/or video courses may be displayed via a GUI. In other embodiments, GUI may show a schedule, such as a date 604 related to user or user profile 608.

Still referring to FIG. 6, GUI may include first quantity of dimensions 612, which may include first quantity of dimensions 176 of FIG. 1, and/or a second quantity of dimensions 616, which may include second quantity of dimensions 184. In one or more embodiments, categories may corresponding to goals or attributes user desires to optimize (e.g., domain targets 124). For instance, and without limitation, user may want to optimize productivity, revenue or income, physical fitness, spirituality, and the like, as previously discussed in this disclosure.

Figure 7:
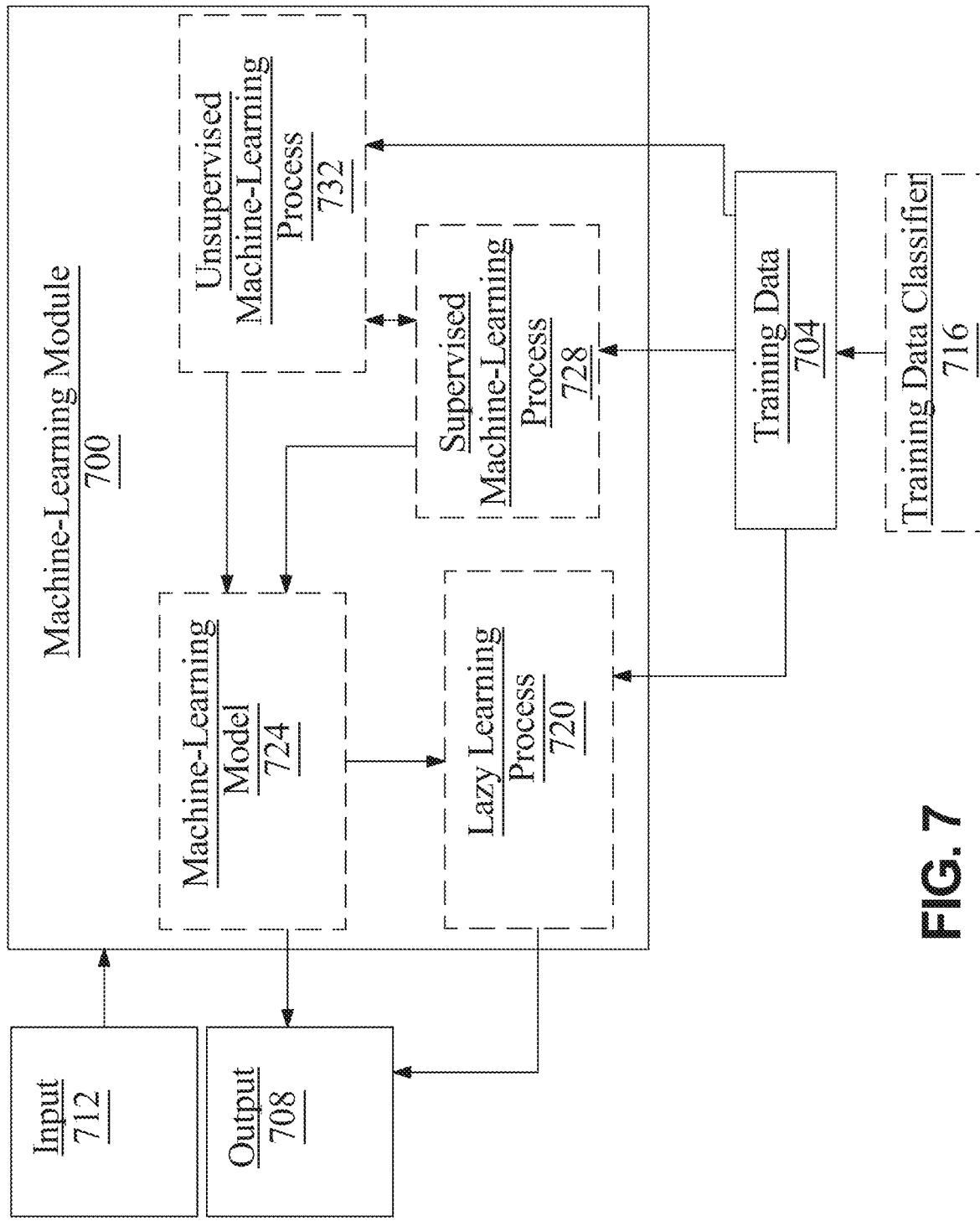
FIG. 7 is a block diagram illustrating exemplary machine learning processes.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include domain-specific data and outputs may include correlated domain targets. Alternatively or additionally, inputs may include scheduling data and at least a domain target correlated to outputs that include schedule components or user schedules. Alternatively or additionally, inputs may include update data and/or domains correlated to evaluations.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to a particular domain, user, or user cohort. For example, in some cases, any machine-learning model described herein may be trained and/or retrained specifically with training data that is representative only of a particular domain, a particular user, or a cohort.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described above as inputs, outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 7, in some embodiments, machine-learning module 700 may be configured to perform automated planning and scheduling. In some cases, automated planning may require iterative processes, allowing feedback (e.g., user input, such as a scheduling change request) to affect planning. In some cases, a planner 700 may input a domain model (a description of a set of possible actions which model the domain) for a single domain as well as a specific problem to be solved specified by, for instance, by an initial state and a goal (e.g., domain target), in contrast to those in which there is no input domain or multiple input domains are specified. Such planners may be called domain independent, as they can solve planning problems from a wide range of domains. Typical examples of domains are described above in reference to FIG. 2. Hence a single domain-independent planner 700 can be used to solve planning problems in all domains and thereby generate a user schedule. In some cases, a maximum number of domains may be constrained by increased complexity in scheduling or planning. In some cases, status within at least a domain may be represented by one or more state variables. Each possible status of at least a domain may be represented by an assignment of values to state variables, and scheduled events (e.g., actions) may determine how the values of the state variables change when that planned schedule event occurs. As a set of state variables induce a state space that has a size that may grow exponentially, planning, and number of maximum number of domains may be constrained to avoid runaway complexity (e.g., dimensional complexity and combinatorial complexity). A number of algorithms and approaches may be used for automated planning.

With continued reference to FIG. 7, exemplary non-limiting approaches for planning include classical planning, reduction to other problems, temporal planning, probabilistic planning, preference-based planning, conditional planning (e.g., contingent planning and conformant planning), and the like. In some cases, classical planning may include a known initial state, deterministic events, non-simultaneous events, and events that are singularly attended to by user. A deterministic event may be expected to change a status (i.e., state variable) of a domain in a predictable way. In some cases, classical planning may include forward chaining state space search, backward chaining search, and partial-order planning. classical planning approaches may be, in some cases, enhanced and/or simplified with heuristics, state constraints, and the like.

With continued reference to FIG. 7, an automated planning algorithm may include a reduction to other problems. In some cases, a reduction to other problems may include reducing planning to a satisfiability problem (e.g., Boolean satisfiability problem). This may be referred to as Planning as Satisfiability (satplan). Exemplary non-limiting satplan algorithms include Davis-Putnam-Logemann-Loveland (DPLL) algorithm, GSAT, and WalkSAT. In some cases, reduction to other problems may include reduction to model checking. Model checking reduction to other problems may include traversing at least a state space and checking to ensure correctness against a given specification.

With continued reference to FIG. 7, an automated planning algorithm may include a temporal planning approach. In some cases, temporal planning can be solved with methods similar to classical planning. Temporal planning may additionally account for a possibility of temporally overlapping events or actions with a duration being taken concurrently. As a result, temporal planning algorithms may define a state to include information about a current absolute time and for how long each event has proceeded. Temporal planning may schedule plans relative rational or real time, or with integer time.

With continued reference to FIG. 7, an automated planning algorithm may include a probabilistic planning approach. Exemplary non-limiting methods of probabilistic planning may include Markov decision processes and/or partially observable Markov decision processes. In some case, probabilistic planning can be solved with iterative methods such as value iteration and policy iteration, for example when state space is sufficiently small. With partial observability, probabilistic planning may be similarly solved with iterative methods, but using a representation of value functions defined for space of beliefs instead of states.

With continued reference to FIG. 7, an automated planning algorithm may include preference-based planning. In preference-based planning, a schedule may be generated that satisfies user-specified preferences. For example, in some cases, a user may input preferences, such as a prioritization of one domain over another, a preference to have certain events at certain times, a preference for certain events to occur on different days, and the like. In some cases, a preference may have a numerical value. In which cases, a Markov Decision Processes (MDP) may be used (i.e., reward-based planning). Alternatively or additionally, in some cases, a user preference may not have a precise numerical value.

With continued reference to FIG. 7, an automated planning algorithm may include conditional planning. In some cases, conditional planning may include hierarchical planning, which may be compared with an automatic generated behavior tree. A normal behavior tree may allow for loops or if-then-statements. Conditional planning may overcome this and allow of these conditions within the automated planning process. In some cases, a planner 700 may synthesize a program, which may then be run in order to generate user schedule. Exemplary non-limiting conditional planner includes "Warplan-C." In some cases, conditional planning may allow for uncertainties during schedule generation. The schedule may then include different contingent events depending upon certain occurrences, such as without limitation user data, update data, and/or evaluation results. In some cases, a conditional planned 700 may generate partial plans or schedule components. In this case, a conditional planner may determine what chunks or schedule components a schedule may be comprised of without forcing a complete plan or schedule of everything from start to finish. In some cases, this approach may help to reduce state space and solve much more complex problems, perhaps allowing for more domains to be considered during scheduling.

With continued reference to FIG. 7, in some cases conditional planning may include contingent planning. Contingent planning may be used when a user's status within a domain (i.e., domain status) may be observable by way of user data and/or update data. As user data and/or update data may provide only an incomplete or imperfect representation of domain status, planner may act incomplete information. For a contingent planning problem, a schedule may no longer be a sequence of events but a decision tree, as each step of the schedule may be represented by a set of states rather than a single perfectly observable state. Contingent planning may also be used when an effect an event will have on a domain state is not knowable a priori and is thus indeterminable. A selected event therefore may depend on state of domains or user. For example, if event fits schedule for Tuesday afternoon, then event will be Tuesday afternoon, otherwise event may be Thursday morning. A particular case of contiguous planning may be represented by fully observable and non-deterministic (FOND) problems.

With continued reference to FIG. 7, in some cases, conditional planning may include conformant planning. Conformant planning may be employed when planner 700 is uncertain about state of domain or user and cannot make any observations. For example, between periods of update data. In this case, planner 700 is unable to verify beliefs about user's status, for instance within at least a domain. In some cases, conformant planning may proceed similar to methods for classical planning. Exemplary non-limiting computer languages for planning include Stanford Research Institute Problem Solver (STRIPS), graphplan, Planning Domain Definition Language (PDDL), and Action Description Language (ADL). An alternative language for describing planning problems may include hierarchical task networks, in which a set of tasks may be given. In some cases, each task can be either realized by a primitive action or event or decomposed into a set of other tasks. In some cases, a hierarchical task network may not involve state variables, although in some cases state variables may be used and may simplify description of task networks.

Figure 8:
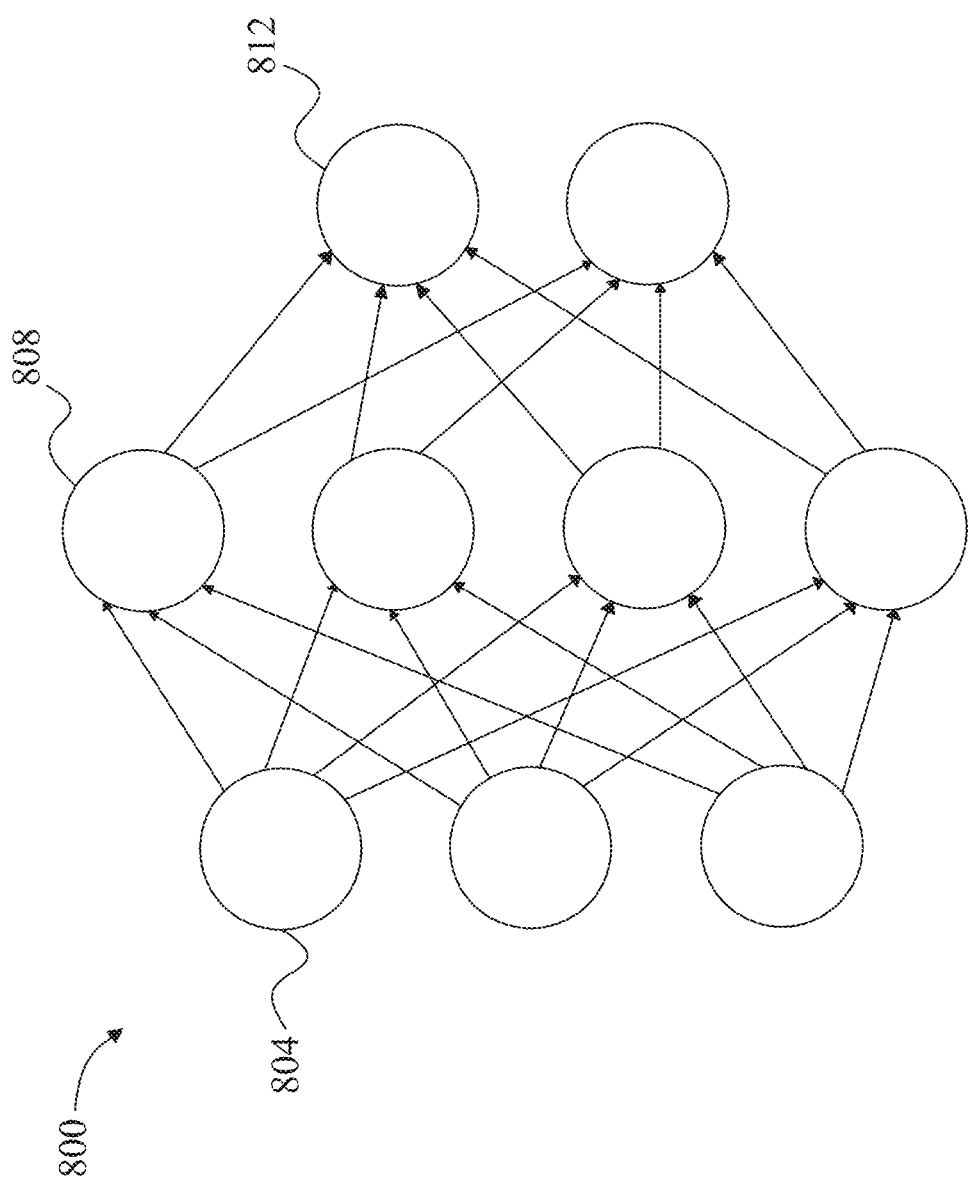
FIG. 8 is a block diagram illustrating an exemplary nodal network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
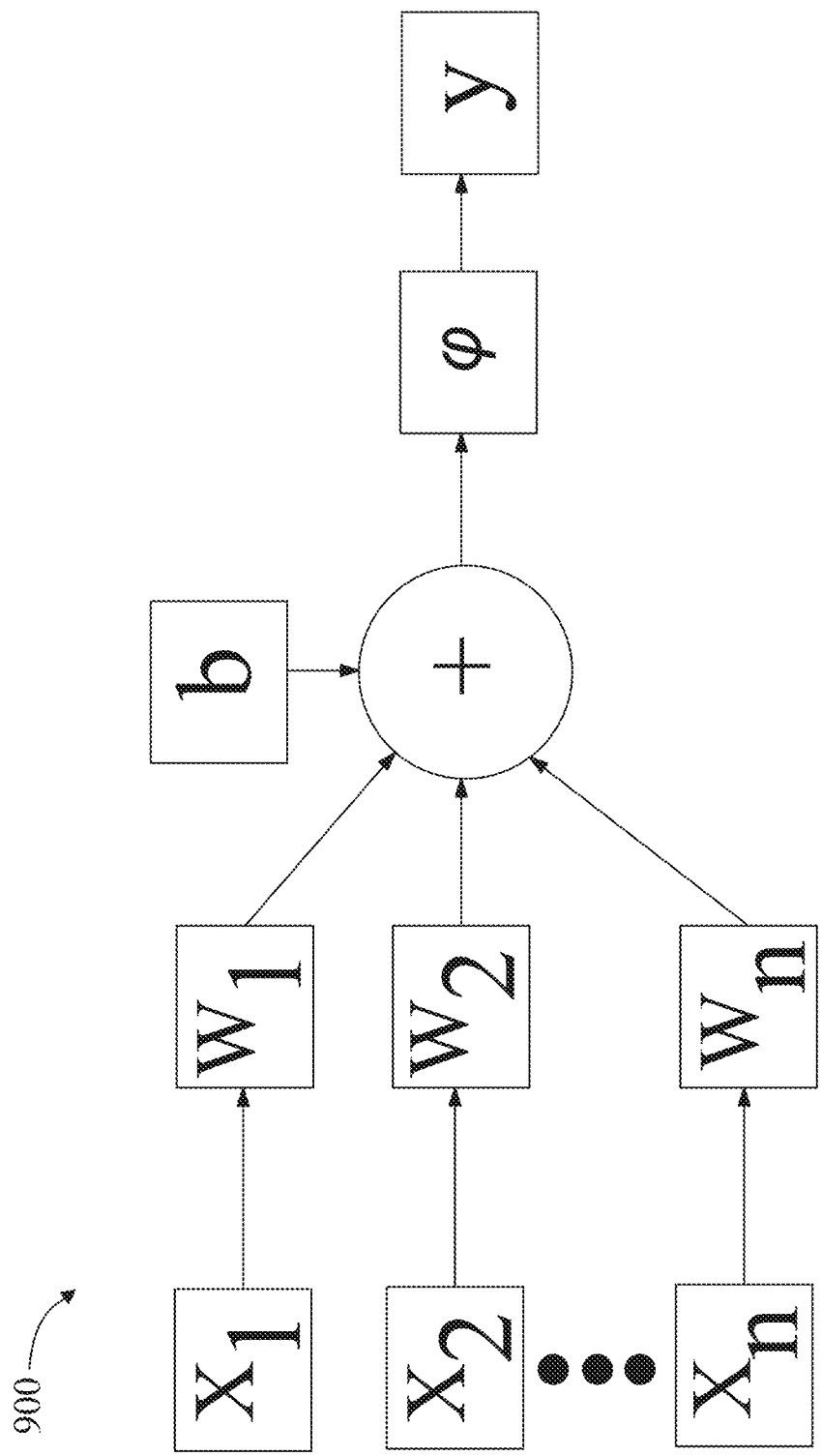
FIG. 9 is a block diagram illustrating an exemplary node.

Referring now to FIG. 9, an exemplary embodiment of a node 900 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^x}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring again to FIG. 1, In some embodiments, computing device 104 may be configured to modify a training set in response to user data, update data, and/or a scheduling change request. For example, computing device 104 may, in some cases, retrain a machine-learning model, for instance target-setting machine learning model 128, representation machine-learning model 140, and/or evaluating machine-learning model 156. In some embodiments, computing device 104 may be configured to classify at least domain target 124*a*-*n* and determine a confidence metric. For example, in some exemplary embodiments confidence metric may be a floating-point number within a prescribed range, such as without limitation 0 to 1, with each end of the prescribed range representing an extreme representation, such as without limitation substantially no confidence and substantially absolute confidence, respectively. In some cases, confidence metric may represent a relationship between a result of filtering and/or classifying at least a domain target 124*a*-*n*. Confidence metric may be determined by one more comparisons algorithms, such as without limitation a fuzzy set comparison. For example, in some exemplary embodiments a fuzzy set comparison may be employed to compare domain specific data 120*a*-*n* with a membership function derived to represent at least a domain target 124*a-n* for classification.

Figure 10:
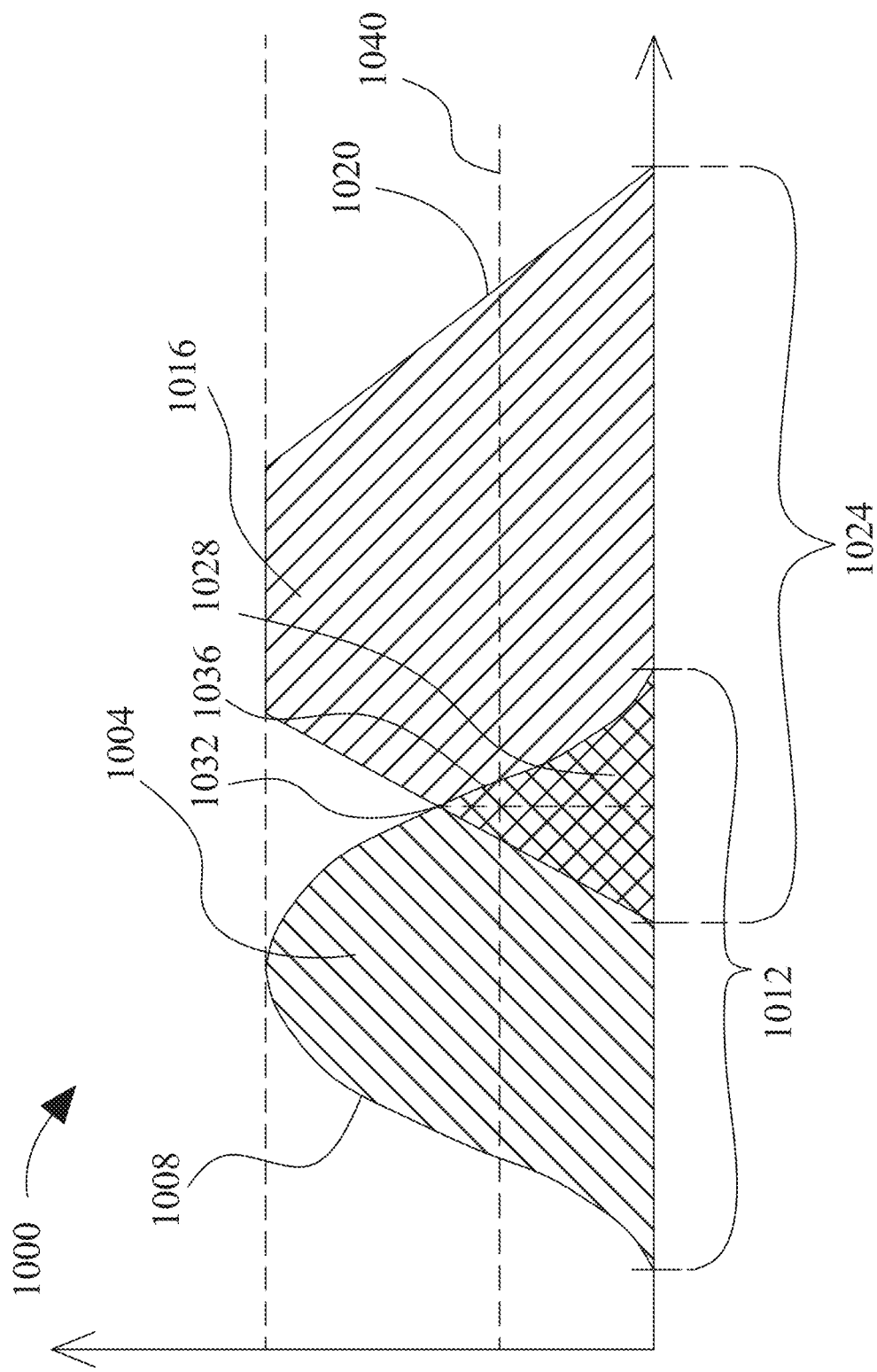
FIG. 10 is a block diagram illustrating exemplary fuzzy sets.

Referring to FIG. 10, an exemplary embodiment of fuzzy set comparison 1000 is illustrated. A first fuzzy set 1004 may be represented, without limitation, according to a first membership function 1008 representing a probability that an input falling on a first range of values 1012 is a member of the first fuzzy set 1004, where the first membership function 1008 has values on a range of probabilities such as without limitation the interval [0,1], and an area beneath the first membership function 1008 may represent a set of values within first fuzzy set 1004. Although first range of values 1012 is illustrated for clarity in this exemplary depiction as a range on a single number line or axis, first range of values 1012 may be defined on two or more dimensions, representing, for instance, a Cartesian product between a plurality of ranges, curves, axes, spaces, dimensions, or the like. First membership function 1008 may include any suitable function mapping first range 1012 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 10, first fuzzy set 1004 may represent any value or combination of values as described above, including output from one or more machine-learning models and user data from remote device 108, a predetermined class, such as without limitation a domain status and/or a domain target. A second fuzzy set 1016, which may represent any value which may be represented by first fuzzy set 1004, may be defined by a second membership function 1020 on a second range 1024; second range 1024 may be identical and/or overlap with first range 1012 and/or may be combined with first range via Cartesian product or the like to generate a mapping permitting evaluation overlap of first fuzzy set 1004 and second fuzzy set 1016. Where first fuzzy set 1004 and second fuzzy set 1016 have a region 1028 that overlaps, first membership function 1008 and second membership function 1020 may intersect at a point 1032 representing a probability, as defined on probability interval, of a match between first fuzzy set 1004 and second fuzzy set 1016. Alternatively or additionally, a single value of first and/or second fuzzy set may be located at a locus 1036 on first range 1012 and/or second range 1024, where a probability of membership may be taken by evaluation of first membership function 1008 and/or second membership function 1020 at that range point. A probability at 1028 and/or 1032 may be compared to a threshold 1040 to determine whether a positive match is indicated. Threshold 1040 may, in a non-limiting example, represent a degree of match between first fuzzy set 1004 and second fuzzy set 1016, and/or single values therein with each other or with either set, which is sufficient for purposes of the matching process; for instance, threshold may indicate a sufficient degree of overlap between an output from one or more machine-learning models and/or user data from remote device 108 and a predetermined class, such as without limitation a domain status and/or domain target, for combination to occur as described above. Alternatively or additionally, each threshold may be tuned by a machine-learning and/or statistical process, for instance and without limitation as described in further detail below.

Further referring to FIG. 10, in an embodiment, a degree of match between fuzzy sets may be used to classify. For instance, if a domain-specific data has a fuzzy set matching a domain target fuzzy set by having a degree of overlap exceeding a threshold, computing device 104 may classify the domain-specific data as belonging to the domain target. Where multiple fuzzy matches are performed, degrees of match for each respective fuzzy set may be computed and aggregated through, for instance, addition, averaging, or the like, to determine an overall degree of match.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
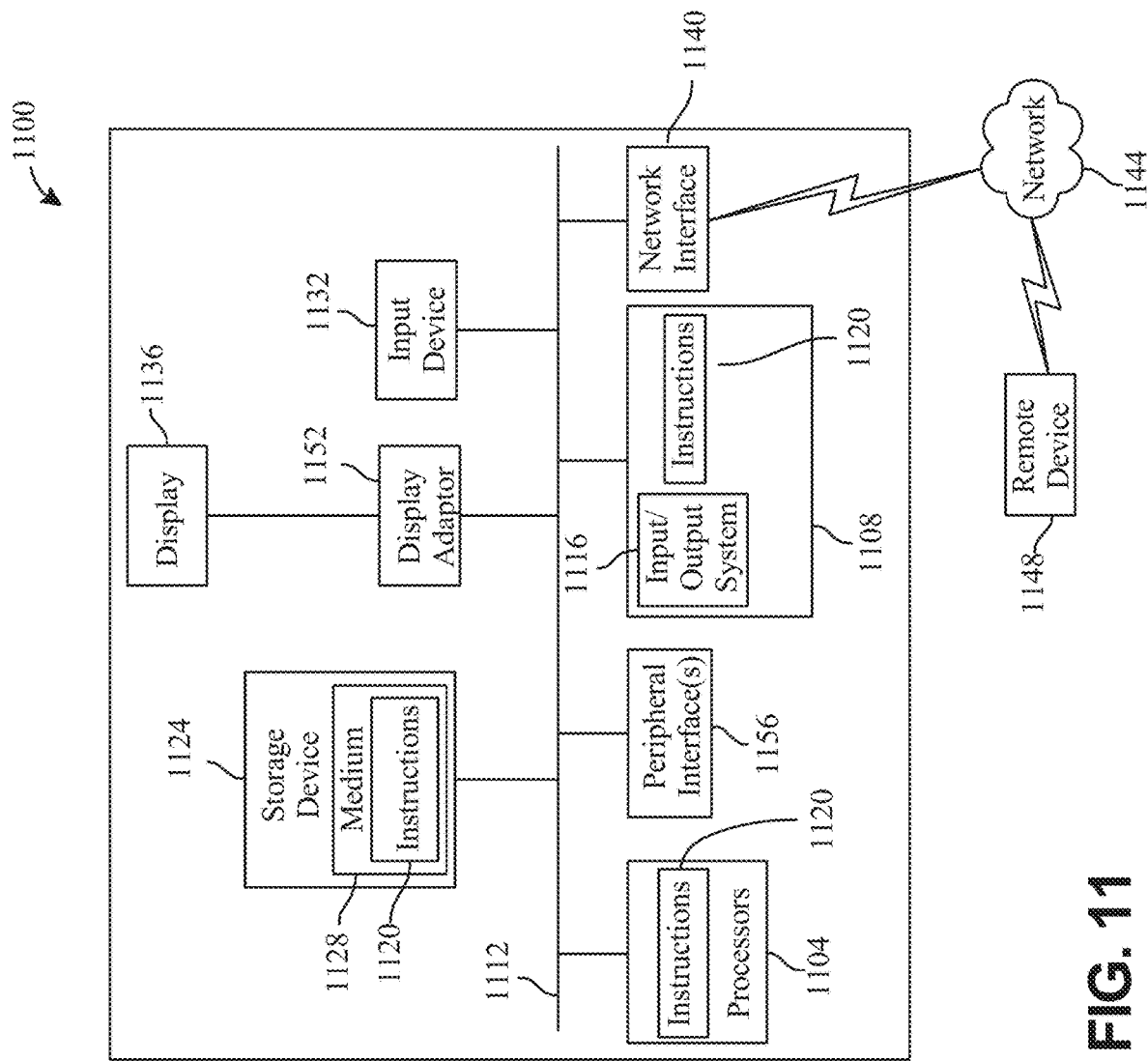
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computing device 1100 within which a set of instructions for causing a control system to perform any one or more of the aspects and/or methodologies of the present disclosure may be executed. Computing device 1100 may include computing device 104 of FIG. 1. It is also contemplated that multiple computing devices may be utilized to implement a specially configured set of instructions for causing one or more of the devices to perform any one or more of the aspects and/or methodologies of the present disclosure. Computing device 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). Processor 1104 may include any processor described in this disclosure, such as processor of FIG. 1.

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computing device 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof. Memory 1108 may include any memory described in this disclosure, such as memory of FIG. 1.

Computing device 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computing device 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computing device 1100. In one example, software 1120 may reside, completely or partially, within machine-readable medium 1128. In another example, software 1120 may reside, completely or partially, within processor 1104.

Computing device 1100 may also include an input device 1132. In one example, a user of computing device 1100 may enter commands and/or other information into computing device 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computing device 1100 via storage device 1124 (e.g., a removable disk drive, a flash drive, etc.) and/or network interface device 1140. A network interface device, such as network interface device 1140, may be utilized for connecting computing device 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computing device 1100 via network interface device 1140.

Computing device 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computing device 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

Figure 12:
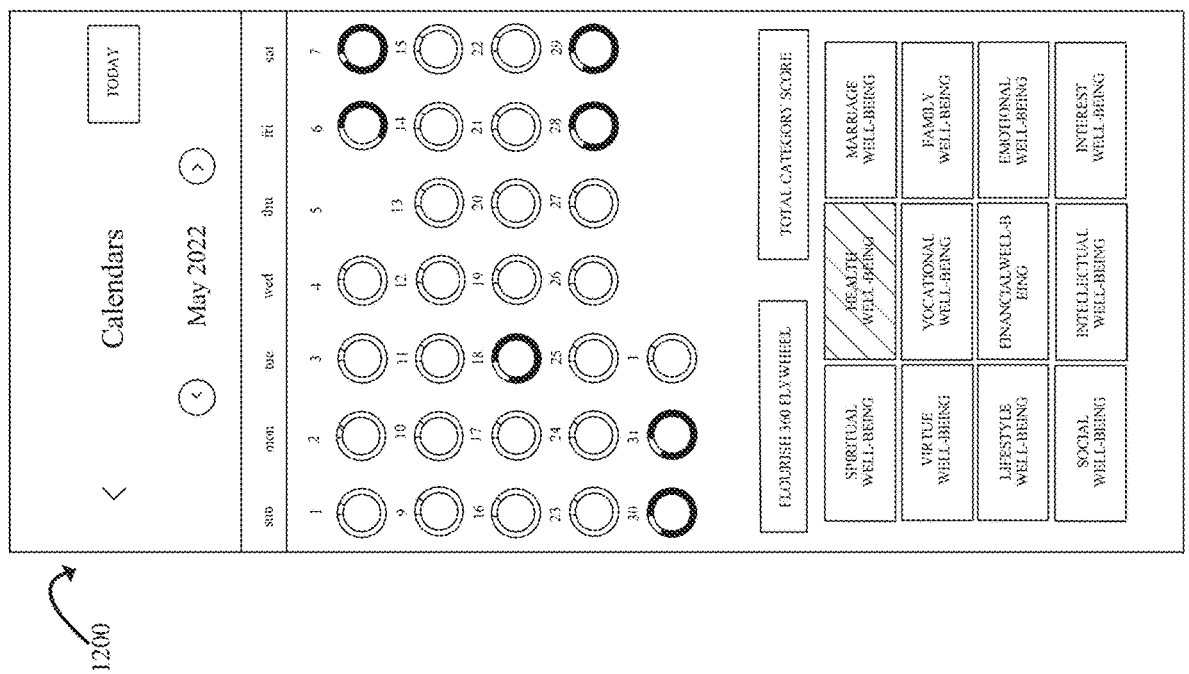
FIG. 12 is an exemplary remote device including an exemplary graphical user interface.

Referring now to FIG. 12, an exemplary display 1200 on a remote device is illustrated. In some cases, remote device may interface with user by way of a graphical user interface (GUI). In some cases, remote device may display domain-specific information, for instance information related to health domain. In some cases, an overall domain-specific ratings for each day of a month may be shown via a display. As a non-limiting example, health domain may be selected via a GUI. In response to health domain being selected, domain-specific ratings for each day may be presented via the GUI. In some embodiments, domain-specific ratings may be displayed as a partially or completely filled donut-shaped graphic on the GUI. In some embodiments, domain-specific ratings may be displayed within the donut-shaped graphic. In some instances, partially or completely-filled donut-shaped graphics may be filled with various colors dependent on a domain-specific rating.

Figure 13A:
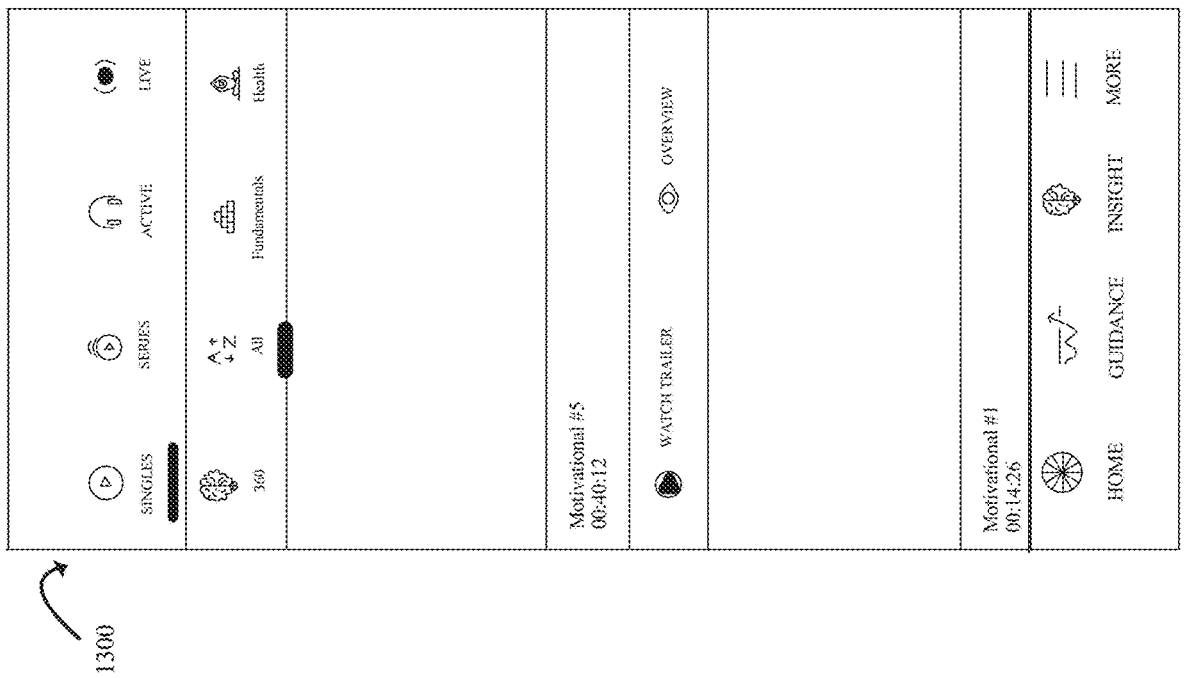
FIG. 13A is an exemplary remote device including an exemplary graphical user interface.

Referring now to FIG. 13A, an exemplary display 1300 on a remote device is illustrated. In some cases, remote device may interface with user by way of a graphical user interface (GUI). In some cases, remote device may display domain-specific information, for instance information related to health domain. In some cases, one or more suggested videos and/or video courses may be displayed via a GUI.

Figure 13B:
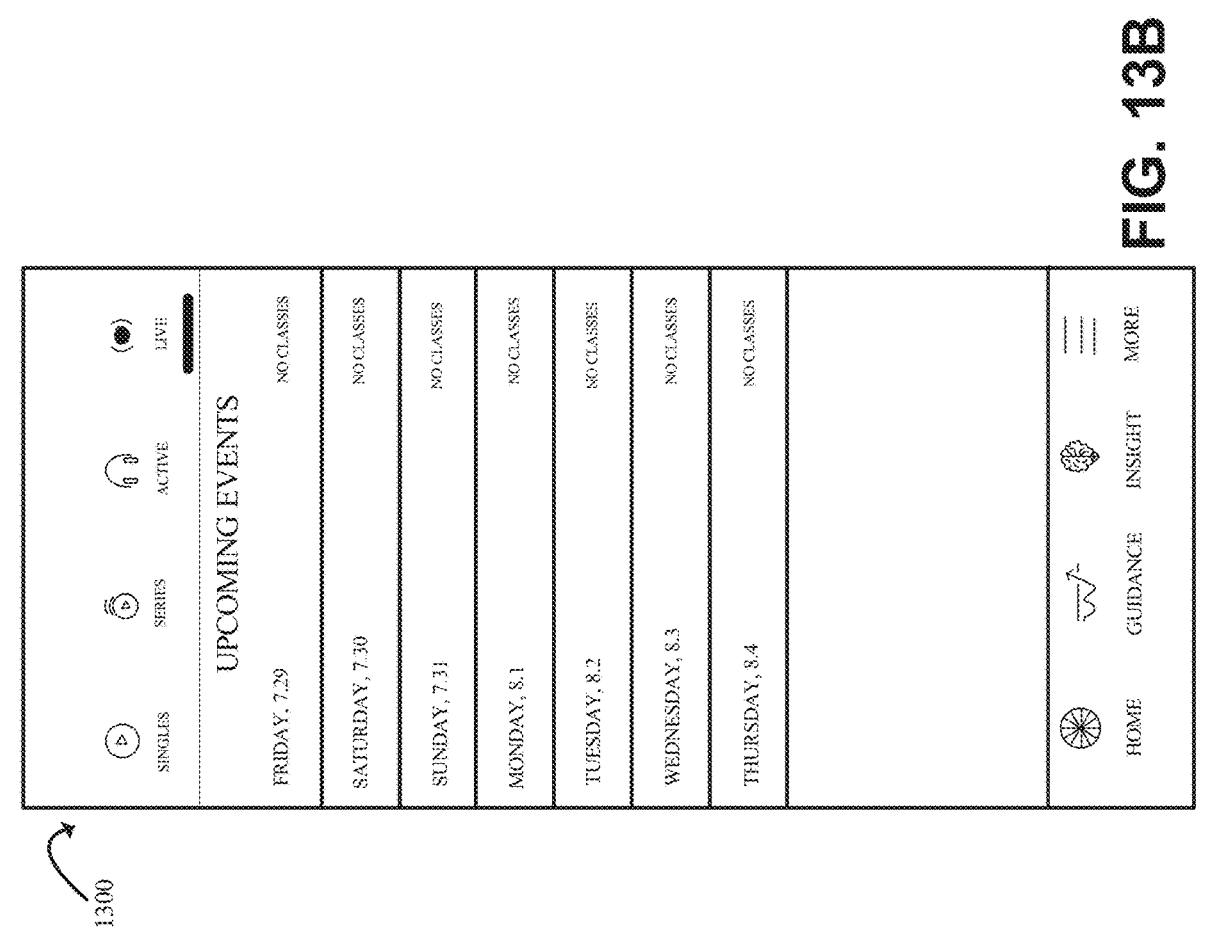

Referring now to FIG. 13B, an exemplary display 1300 remote device is illustrated. In some cases, remote device may interface with user by way of a graphical user interface (GUI). In some cases, remote device may display domain-specific information, for instance information related to health domain. In some cases, one or more suggested videos and/or video courses may be displayed via a GUI in a textual format. In some cases, there may be zero suggested videos and/or courses displayed via a GUI.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating projections of representations of data in a plurality of spaces, the method comprising:
   receiving, by a computing device, user data of a user;
   generating, by the computing device, a representation in a first space as a function of the first data, wherein the first space comprises a first quantity of dimensions;
      wherein generating the representation in the first space comprises selecting a number of dimensions of the first quantity of dimensions;
   projecting, by the computing device, the representation to a second space, wherein the second space comprises a second quantity of dimensions, wherein projecting the representation to the second space comprises:
      presenting a graphic showing a completion percentage of the user of a plurality of lessons, wherein the graphic is a chart; and
      determining a fractal dimension of the chart;
   presenting, by the computing device at a remote device, a notification to the user related to the projection.

2. The method of claim 1, wherein the first quantity of dimensions comprises one or more elements of a schedule.

3. The method of claim 2, wherein the schedule comprises a plurality of lessons related to a domain.

4. The method of claim 1, wherein generating the representation comprises:
   receiving representation training data correlating user element inputs to representation element inputs;
   iteratively training a representation machine-learning model as a function of the representation training data; and
   generating the representation as a function of the user data and the representation machine-learning model.

5. The method of claim 1, wherein user data comprises spiritual advancement.

6. The method of claim 1, wherein the second quantity of dimensions comprises a progress of the user over a predetermined amount of time.

7. The method of claim 6, wherein the predetermined amount of time comprises a 30-day interval.

8. The method of claim 1 comprising:
- interrogating, by the computing device, the remote device for update data associated with the user;
- evaluating, by the computing device, the update data as a function of a user schedule; and
- displaying, by the computing device at the remote device, evaluation results to the user.

9. The method of claim 8, wherein evaluating the update data comprises:
- inputting the update data and the user schedule to an evaluating machine learning model; and
- generating the evaluation results as a function of the evaluating machine learning model.

10. The method of claim 9, further comprising:
- iteratively training the evaluating machine learning model, wherein training the evaluating machine learning model comprises:
- inputting evaluating training data to a machine learning algorithm, wherein the evaluating training data comprises a plurality of update data correlated to evaluations; and
- training the evaluating machine learning model as a function of the machine learning algorithm.

11. An apparatus for generating an optimal schedule for interactive curriculum, the apparatus comprising:
- at least a processor; and
- a memory, the memory containing instructions configuring the at least a processor to:
  - receive user data of a user;
  - generate a representation in a first space as a function of the first data, wherein the first space comprises a first quantity of dimensions;
  - project the representation to a second space, wherein the second space comprises a second quantity of dimensions wherein projecting the representation to the second space comprises:
    - presenting a graphic showing a completion percentage of the user of a plurality of lessons, wherein the graphic is a chart; and
    - determining a fractal dimension of the chart;
  - present at a remote device a notification to the user related to the first quantity of dimensions and the second quantity of dimensions.

12. The apparatus of claim 11, wherein the first quantity of dimensions comprises one or more elements of a schedule.

13. The apparatus of claim 12, wherein the schedule comprises a plurality of lessons related to a domain.

14. The apparatus of claim 11, wherein generating the representation comprises:
- receiving representation training data correlating user element inputs to representation element inputs;
- iteratively training a representation machine-learning model as a function of the representation training data; and
- generating the representation as a function of the user data and the representation machine-learning model.

15. The apparatus of claim 11, wherein user data comprises spiritual advancement.

16. The apparatus of claim 11, wherein the second quantity of dimensions comprises a progress of the user over a predetermined amount of time.

* * * * *